United States Patent
George, IV

(10) Patent No.: US 10,893,017 B2
(45) Date of Patent: Jan. 12, 2021

(54) USE OF DNS INFORMATION AS TRIGGER FOR DYNAMIC IPV4 ADDRESS ALLOCATION

(71) Applicant: Time Warner Cable Enterprises LLC, St. Louis, MO (US)

(72) Inventor: Wesley E. George, IV, Manassas, VA (US)

(73) Assignee: TIME WARNER CABLE ENTERPRISES LLC, St. Louis, MO (US)

(*) Notice: Subject to any disclaimer, the term of this patent is extended or adjusted under 35 U.S.C. 154(b) by 115 days.

(21) Appl. No.: 16/010,420

(22) Filed: Jun. 16, 2018

(65) Prior Publication Data

US 2018/0302367 A1     Oct. 18, 2018

Related U.S. Application Data

(62) Division of application No. 13/427,606, filed on Mar. 22, 2012, now Pat. No. 10,003,565.

(51) Int. Cl.
*H04L 29/12*     (2006.01)

(52) U.S. Cl.
CPC .......... *H04L 61/1511* (2013.01); *H04L 29/12* (2013.01); *H04L 61/00* (2013.01); *H04L 61/2514* (2013.01)

(58) Field of Classification Search
None
See application file for complete search history.

(56) References Cited

U.S. PATENT DOCUMENTS

| | | | |
|---|---|---|---|
| 7,277,453 B2 | 10/2007 | Chin | |
| 7,720,997 B1 | 5/2010 | Gourlay | |
| 8,243,740 B1 | 8/2012 | Pierce | |
| 8,861,525 B1 | 10/2014 | Durand | |
| 9,112,764 B2 | 8/2015 | Howard | |
| 2002/0036991 A1 | 3/2002 | Inoue | |

(Continued)

OTHER PUBLICATIONS

K. Fleischhauer, Ed. "Draft-fleischhauer-ipv4-addr-saving-01 on demand . . . " downloaded from http://tools.ietf.org/html/draft-fleischhauer-pv4-addr-saving-01 on Feb. 28, 2012 pp. 1-31.

(Continued)

*Primary Examiner* — James A Edwards
(74) *Attorney, Agent, or Firm* — Otterstedt, Wallace & Kammer, LLP

(57) ABSTRACT

A first request, to access a web site associated with a domain name, is obtained at a gateway router interposed between a local area network and an internet service provider's infrastructure, from a host on the local area network. The gateway router has Domain Name Service (DNS) resolver capability. The first request is received while the gateway router has upstream connectivity to the internet service provider's infrastructure via IPv6 but not via IPv4. Further steps include sending, from the gateway router, the first request; obtaining, at the gateway router, an indication that an IPv4 address will imminently be required for the gateway router; and, responsive to obtaining the indication, sending, from the gateway router, into the internet service provider's infrastructure, a second request, for an IPv4 address for the gateway router.

5 Claims, 35 Drawing Sheets

(56) References Cited

U.S. PATENT DOCUMENTS

| | | |
|---|---|---|
| 2002/0154624 A1 | 10/2002 | Oishi |
| 2003/0056217 A1 | 3/2003 | Brooks |
| 2003/0225912 A1 | 12/2003 | Takeda |
| 2004/0184465 A1 | 9/2004 | Lee |
| 2005/0002341 A1 | 1/2005 | Lee |
| 2005/0066041 A1 | 3/2005 | Chin |
| 2005/0076141 A1* | 4/2005 | Williams .......... H04L 29/12066 709/245 |
| 2005/0076142 A1 | 4/2005 | Chin |
| 2006/0146870 A1 | 7/2006 | Harvey |
| 2007/0217436 A1 | 9/2007 | Markley |
| 2008/0240132 A1* | 10/2008 | Sehgal .............. H04L 29/12547 370/401 |
| 2008/0250407 A1 | 10/2008 | Dadhia |
| 2008/0259906 A1 | 10/2008 | Shkedi |
| 2009/0003247 A1 | 1/2009 | Katis |
| 2009/0248794 A1 | 10/2009 | Helms |
| 2010/0313236 A1 | 12/2010 | Straub |
| 2011/0058553 A1* | 3/2011 | Brzozowski ...... H04L 29/12358 370/392 |
| 2011/0153831 A1 | 6/2011 | Mutnuru |
| 2011/0211553 A1 | 9/2011 | Haddad |
| 2012/0158969 A1 | 6/2012 | Dempsky |
| 2012/0185582 A1 | 7/2012 | Graessley |
| 2012/0173685 A1 | 10/2012 | Shorter |
| 2013/0070745 A1 | 3/2013 | Nixon |
| 2013/0080575 A1 | 3/2013 | Prince |
| 2013/0111065 A1 | 5/2013 | Donley |
| 2013/0114502 A1 | 5/2013 | Joshi |
| 2013/0212240 A1 | 8/2013 | Thornewell |
| 2013/0254423 A1 | 9/2013 | George |

OTHER PUBLICATIONS

List of DNS record types, downloaded from http://en.wikipedia.org/wiki/List_of_DNS_record_types on Feb. 28, 2012 pp. 1-9.

Carrier-grade NAT, downloaded from http://en.wikipedia.org/wiki/Carrier-grade_NAT on Mar. 1, 2012 pp. 1-2.

Fully qualified domain name, downloaded from http://en.wikipedia.org/wiki/Fully_qualified_domain_name on Mar. 2, 2012 pp. 1-2.

S. Perreault, Ed. et al. "Common requirements for CGNS . . . 05" downloaded from http://tools.ietf.org/html/draft-ietf-behave-1 sn-requirements-05 on Mar. 10, 2012 pp. 1-19.

Internet Gateway device Protocol, downloaded from http:/ le n. wiki ped ia. org/wiki/l nte rnet_gateway _ device_Protocol on Mar. 17, 2012 p. 1.

NAT traversal, downloaded from http://en.wikipedia.org/wiki/NAT _traversal on Mar. 17, 2012 pp. 1-4.

Docsis, downloaded from http://en.wikipedia.org/wiki/Docsis on Mar. 18, 2012 pp. 1-7.

* cited by examiner

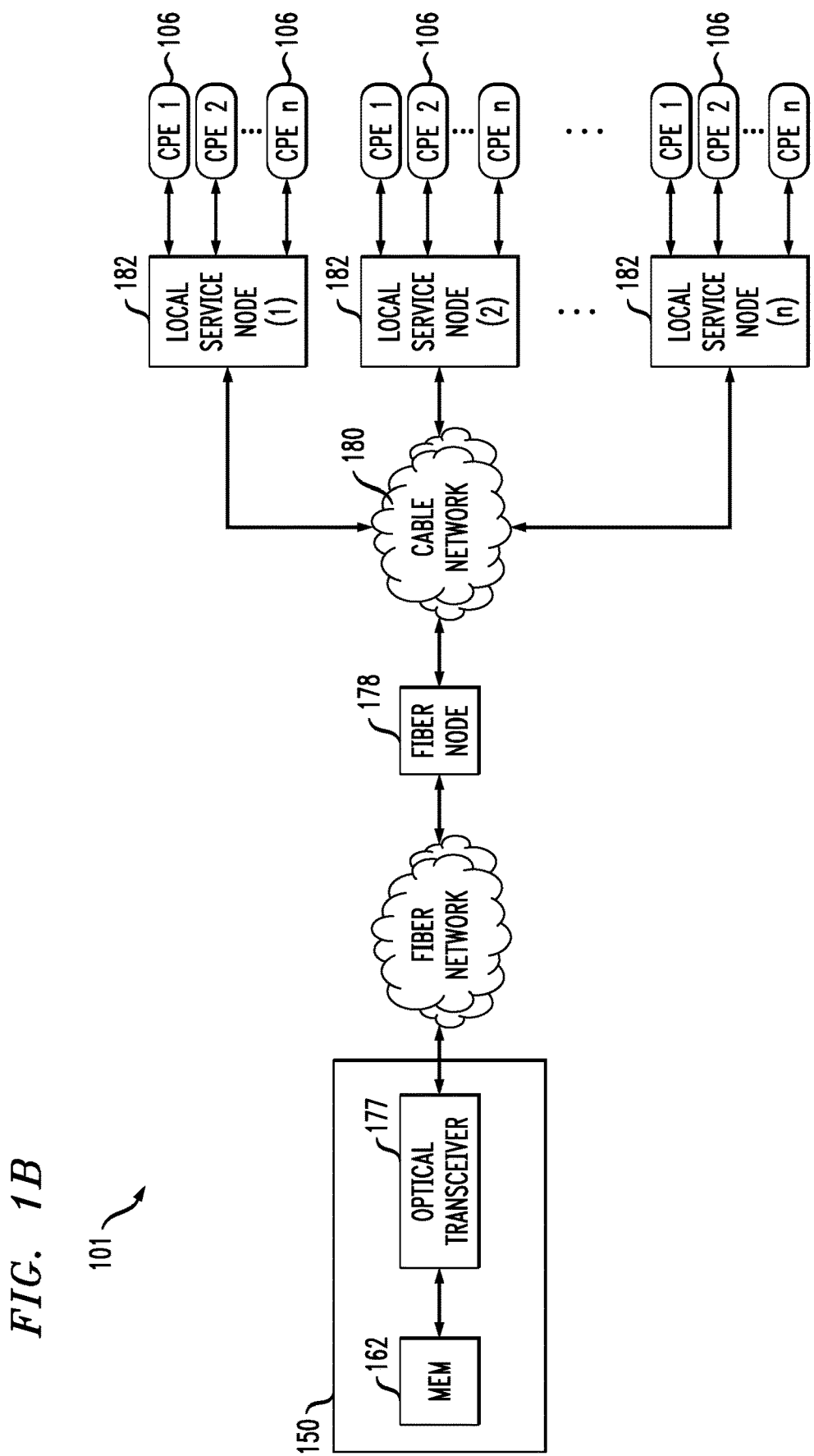

USE OF DNS INFORMATION AS TRIGGER FOR DYNAMIC IPV4 ADDRESS ALLOCATION

CROSS-REFERENCE TO RELATED APPLICATION

This application is a divisional of U.S. patent application Ser. No. 13/427,606 of inventor Wesley E. George IV, and claims the benefit thereof, said application Ser. No. 13/427,606 having been filed on Mar. 22, 2012, and entitled "USE OF DNS INFORMATION AS TRIGGER FOR DYNAMIC IPV4 ADDRESS ALLOCATION." The complete disclosure of the aforesaid application Ser. No. 13/427,606 is expressly incorporated herein by reference in its entirety for all purposes.

FIELD OF THE INVENTION

The present invention relates generally to the electrical, electronic, and computer arts, and more particularly relates to network technology and the like.

BACKGROUND OF THE INVENTION

The great majority of the Internet currently utilizes Internet Protocol Version 4 (IPv4). The address space in IPv4 is becoming exhausted. The eventual exhaustion of the IPv4 address space was recognized some time ago and a common technique of dealing with it was developed. This technique employs network address translation (NAT) wherein a number of private IPv4 addresses, such as within a home or small business network, "hide" behind a single public IPv4 address. Internet Protocol version 6 (IPv6) is a version of the Internet Protocol (IP) that is designed to succeed IPv4.

Note that herein, when the term "IP" is used, it refers generically to IPv4, IPv6, or both types of traffic. When it is desired to refer specifically to IPv4 or IPv6, such specific terminology is employed.

In most residential broadband networks, the connection is "always on" between the user's computer, the user's home gateway internet access router, and the broadband internet service provider. This enables nearly instantaneous connection to sites and services which can be reached via the internet. Typically, each host connected to this network always has an IPv4 address allocated for its exclusive use whenever it is online. However, as IPv4 addresses become scarcer due to the aforementioned exhaustion of the remaining unique IPv4 address space globally, Internet Service Providers (ISPs) are looking for ways to share their current allocations of addresses among multiple customers. The primary way that this is currently accomplished is via Carrier-Grade Network Address Translation (Carrier-grade NAT (CGN), also known as large-scale NAT (LSN)).

CGN is an approach to IPv4 network design in which end sites, in particular residential networks, are configured with private network addresses that are translated to public IPv4 addresses by so-called middlebox network address translator devices embedded in the network operator's network. This permits the sharing of small pools of public addresses among many end sites. This shifts the NAT function and configuration from the customer's premises to the ISP's network. Carrier-grade NAT has also been proposed as an approach for mitigating IPv4 address exhaustion, and easing the transition to IPv6. For further details refer to S. Perreault, Ed., Common requirements for Carrier Grade NATs (CGNs), draft-ietf-behave-lsn-requirements-05, Internet Engineering Task Force, Internet-Draft, Nov. 30, 2011, incorporated by reference herein in its entirety for all purposes.

SUMMARY OF THE INVENTION

Techniques are provided for use of DNS information (or other information) as a trigger for dynamic IPv4 address allocation.

In one aspect, an exemplary method includes the step of obtaining, at a gateway router interposed between a local area network and an internet service provider's infrastructure, from a host on the local area network, a first request. The first request is a request to access a web site associated with a domain name. The gateway router has Domain Name Service (DNS) resolver capability. The first request is received while the gateway router has upstream connectivity to the internet service provider's infrastructure via Internet Protocol Version 6 (IPv6) but not via Internet Protocol Version 4 (IPv4). Further steps include sending, from the gateway router, the first request; obtaining, at the gateway router, an indication that an Internet Protocol Version 4 (IPv4) address will imminently be required for the gateway router; and, responsive to obtaining the indication, sending, from the gateway router, into the internet service provider's infrastructure, a second request. The second request is for an Internet Protocol Version 4 (IPv4) address for the gateway router.

In another aspect, a gateway router is provided for interposition between a local area network and an internet service provider's infrastructure. The gateway router includes a memory and at least one processor, which is coupled to the memory. The memory stores, in a non-transitory manner, a plurality of distinct software modules. Said distinct software modules include, for example a DNS client/server module and a DHCP client/server module. The DNS client server module includes instructions configured to cause the at least one processor to obtain the first request, send the first request, and obtain the indication. The DHCP client server module includes instructions configured to cause the at least one processor to send the second request.

In still another aspect, another exemplary method includes the step of obtaining, at a network address translation module of a gateway router, a request from a local host for a Universal Plug and Play (UPnP) port mapping on Internet Protocol Version 4 (IPv4); and, responsive to obtaining said request, sending, from said gateway router, into an infrastructure of an internet service provider, a request for an Internet Protocol Version 4 (IPv4) address for said gateway router.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

One or more embodiments of the invention can provide substantial beneficial technical effects, including, for example:

Enables avoidance of use of CGN as an IPv4 address-sharing mechanism (note, however, that at least some embodiments can also be used in conjunction with a CGN as a way to reduce the usage of IPv4 and consolidate the number of customers associated with a single CGN).

Enables use of IPv4 address oversubscription (sharing addresses between multiple customers) based on the assumption of non-simultaneous use; i.e., IPv4 addresses are not in continuous use by all customers, and therefore can be moved around (assigned temporarily and reclaimed when idle) between customers as IPv4 connectivity is needed.

Enables use of the above oversubscription/on-demand IPv4 addressing without the risk of IPv4 data connection failures when a host attempts to make an IPv4 connection but an IPv4 address is not available to send the data in the time before the failure timer elapses.

Enables more widespread use of IPv6 for communications by ensuring that even devices that only make DNS queries over IPv4 (e.g. PCs running the Windows XP OS (operating system)) are not causing IPv4 to remain in use for DNS.

These and other features and advantages of the invention will become apparent from the following detailed description of illustrative embodiments thereof, which is to be read in connection with the accompanying drawings.

BRIEF DESCRIPTION OF THE DRAWINGS

FIG. 1B is a functional block diagram illustrating one exemplary local service node configuration;

DETAILED DESCRIPTION OF PREFERRED EMBODIMENTS

Embodiments of the invention may be employed in a variety of settings. A non-limiting exemplary embodiment will be described within the context of a content-based network, such as an HFC video content network of a cable multiple system operator (MSO) or the like. However, it is to be emphasized that this is purely by way of a non-limiting example. One or more embodiments of the invention are generally applicable to IP transport of data, whether that data happens to be MSO-provided or Over the Top (OTT) video, VoIP, or other internet communications. One or more embodiments are broadly applicable to all IPv4 data transmitted between the end user behind a home (or other) network and his or her intended destination. Thus, the context of IP transport of data over a content network, such as a video content network, is but a non-limiting example, and one or more embodiments can also be employed in cases not involving video content networks. One or more embodiments can be employed, for example, in broadband networks such as residential broadband networks; DSL networks; fiber-to-the-home (FTTH), fiber-to-the-node (FTTN), or fiber-to-the-curb (FTTC) networks; wireless Internet service providers (WISP)(fixed wireless to replace home broadband, typically in rural areas); or indeed to any situation with an on-demand IPv4 connection and dynamically assigned addressing.

Figure 1:
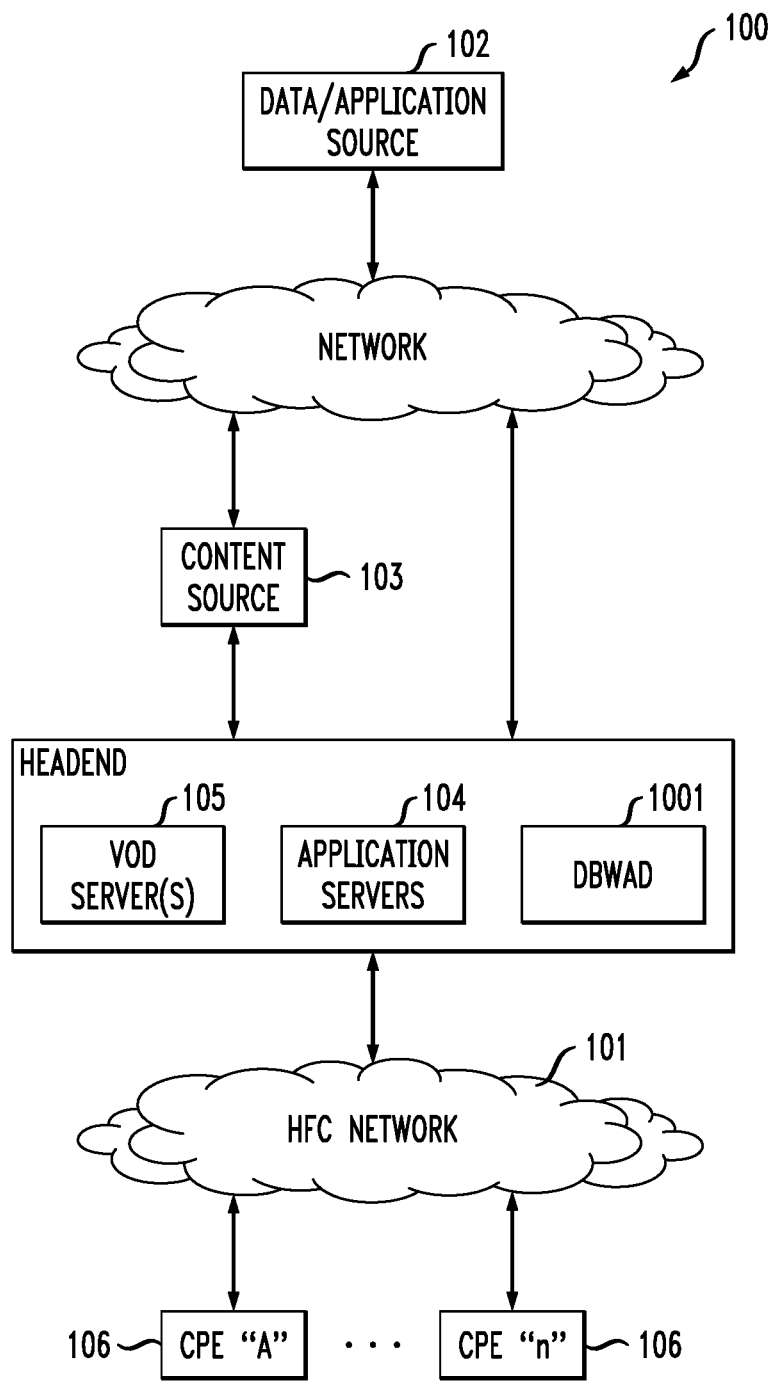
FIG. 1 is a functional block diagram illustrating an exemplary hybrid fiber-coaxial (HFC) network configuration.

FIG. 1 illustrates a typical content-based network configuration 100. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) 106. In a preferred approach, at least some of the CPE units 106 are premises internet gateway routers with DNS server capability. Also included is a dynamic bandwidth allocation device (DBWAD) 1001 such as a global session resource manager, which is itself a non-limiting example of a session resource manager. The distribution server(s) 104, VOD servers 105, DBWAD 1001, and CPE(s) 106 are connected via a bearer (e.g., hybrid fiber cable (HFC)) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 1A (described in greater detail below) may be used.

It should be noted at this point that in addition to a conventional HFC network or a switched digital network, other kinds of video content networks can be employed for network 101 (e.g., fiber-to-the-home (FTTH) or fiber-to-the-curb (FTTC); digital subscriber line (DSL); wireless networks such as Wi-Fi, various 3G or 4G standards such as WiMAX (Worldwide Interoperability for Microwave Access), 3GPP Long Term Evolution (LTE); and the like). Again, for the avoidance of doubt, the HFC network details set forth herein are merely provided to show one non-limiting exemplary environment. Furthermore, it is to be emphasized that embodiments of the invention can be employed in many different situations where a gateway device or the like is interposed between: (i) the Internet or another internet; and (ii) a premises or the like, and are not limited to video content networks.

The data/application origination point 102 comprises any medium that allows data and/or applications (such as a VOD-based or "Watch TV" application) to be transferred to a distribution server 104 (for example, over a suitable network, not separately numbered). This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill. Note that, in general, one or more embodiments of the invention are applicable to situations that do not involve an MSO at all and/or situations involving a generic web application server (HTTP, for example) or other items that are not contained within the MSO's network or controlled by the MSO. One or more embodiments permit but do not require the server in question to be owned or managed by the MSO or other broadband provider.

Continuing with the description of a typical content network, the application distribution server 104 comprises a computer system where such applications can enter the network system. Distribution servers per se are well known in the networking arts.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104 and/or can function as described below with regard to FIGS. 4-31; for example, set-top terminal (STT), digital set-top box (DSTB), set-top box (STB), or simply "box," and the like. As noted above, in a preferred approach, at least some of the CPE 106 are premises internet gateway routers with DNS server capability.

Currently, residences and small businesses obtain access to the Internet via a number of techniques. One example is by subscribing through an MSO; such an MSO may provide a variety of services such as broadcast television, Video-On-Demand (VOD), broadband data services, IP telephony, and the like. Further details will now be provided regarding the transmission of video content in such a network. However, as also noted elsewhere herein, embodiments of the invention are generally applicable to IP transport of data. Thus, the context of IP transport of data over a content network, such as a video content network, is but a non-limiting example, and one or more embodiments can also be employed in networks other than video content networks.

Nevertheless, for completeness in describing a typical video content network, note that with the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well-known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Figure 1A:
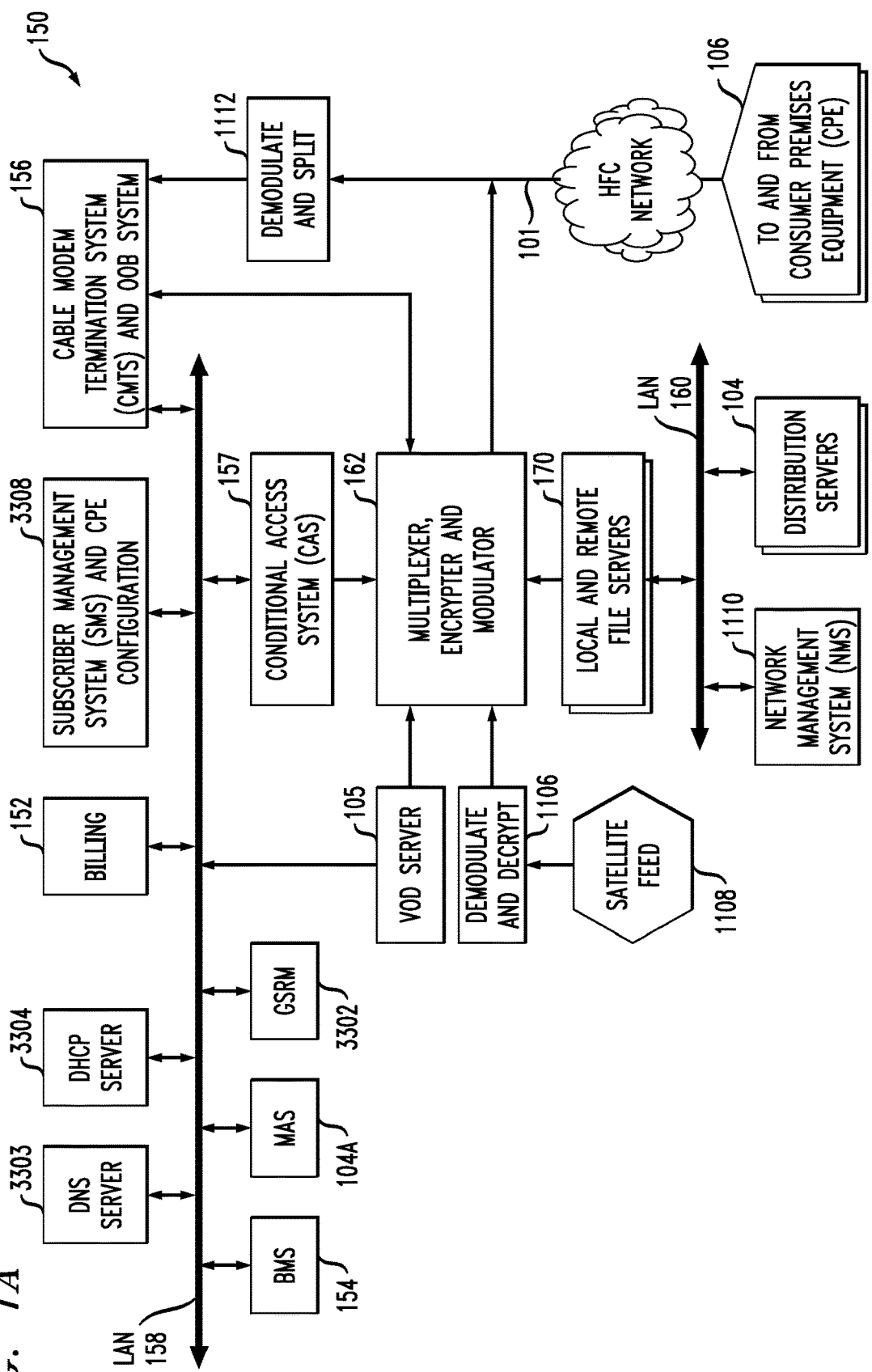
FIG. 1A is a functional block diagram illustrating one exemplary HFC cable network head-end configuration.

Referring now to FIG. 1A, one exemplary embodiment of a head-end architecture is described. As shown in FIG. 1A, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 1A is high-level, conceptual architecture and that each multi-service operator or multiple system operator (MSO) may have multiple head-ends deployed using custom architectures.

The architecture 150 of FIG. 1A further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 1B) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes. Other pertinent materials include the Data-Over-Cable Service Interface Specifications, IPv4 and IPv6 eRouter Specification (version 1.0 and any other versions), CM-SP-eRouter-I05-110210, and the Data-Over-Cable Service Interface Specifications, DOCSIS Set-top Gateway (DSG) Interface Specification, CM-SP-DSG-I17-110210, both available from Cable Television Laboratories, Inc., and both expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application of one or more embodiments. However, one or more embodiments are generally applicable to IP transport of data, regardless of what kind of network is employed. Indeed, as noted, one or more embodiments are generally applicable to all IPv4 data transmitted between the end user behind a home (or other) network and the intended destination.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 1A are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

The ISP DNS server could be located in the head-end as shown at 3303, but as discussed further below, it can also be located in a variety of other places. As also discussed further below, the DHCP server 3304 receives the request for an IPv4 address from the CPE router and either defers the request or assigns an address as necessary.

As shown in FIG. 1B, the network 101 of FIGS. 1 and 1A comprises a fiber/coax arrangement wherein the output of the MEM 162 of FIG. 1A is transferred to the optical domain (such as via an optical transceiver 177 at the head-end 150 or further downstream). The optical domain signals are then distributed to a fiber node 178, which further distributes the signals over a distribution network 180 to a plurality of local servicing nodes 182. This provides an effective 1:N expansion of the network at the local service end.

Certain additional aspects of video or other content delivery will now be discussed for completeness, it being understood that embodiments of the invention have broad applicability to IP data communications and transport. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes. Again, for the avoidance of doubt, any device that can be modified to function as explained below with respect to elements 4008, 4010 can be employed; specific examples of CPE are exemplary and non-limiting.

Figure 2:
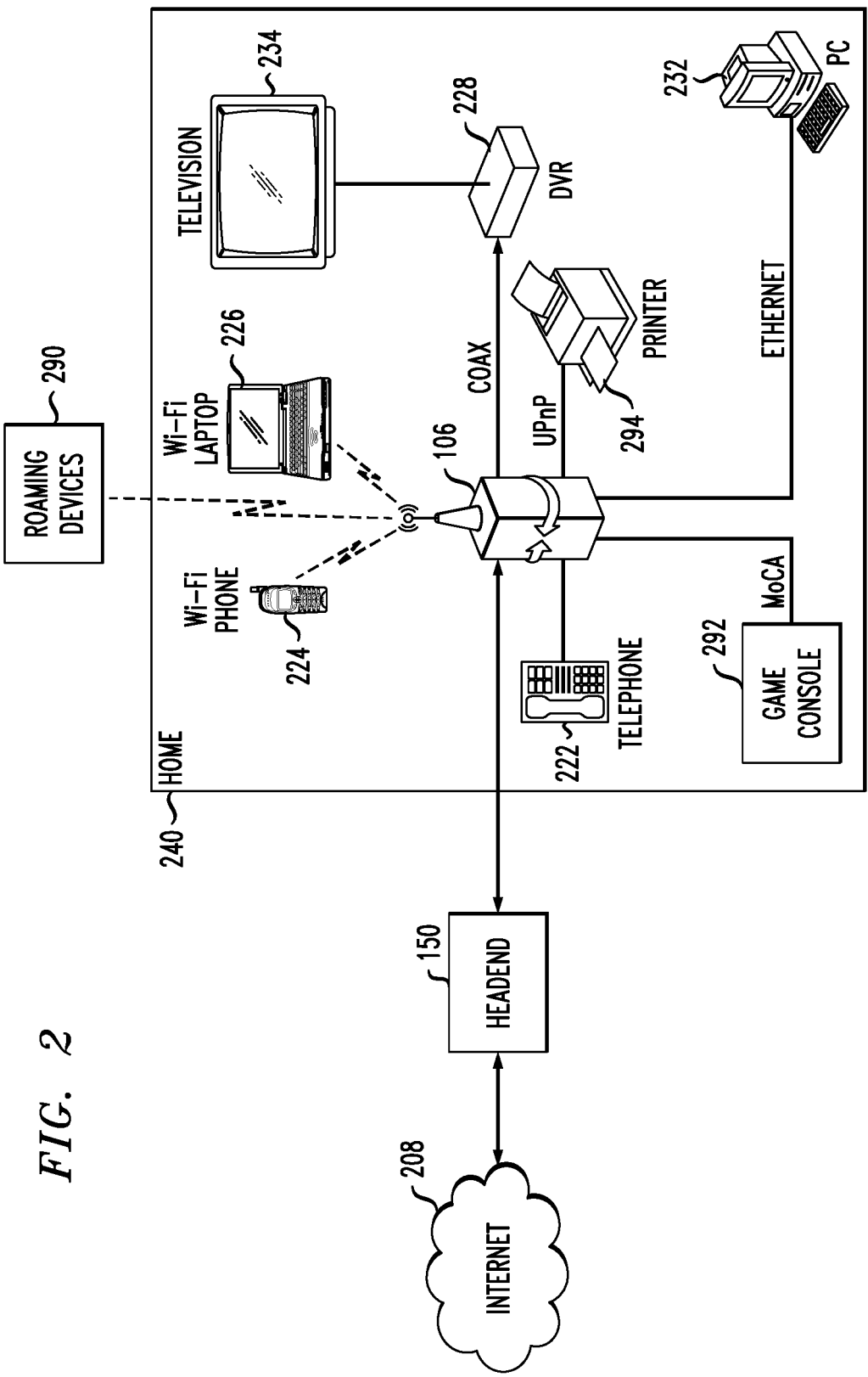
FIG. 2 is a functional block diagram of a content and data distribution network configured in accordance with one embodiment of the invention.

Reference should now be had to FIG. 2, which presents a block diagram of a premises network interfacing with a head end of an MSO or the like, providing Internet access. An exemplary advanced wireless gateway comprising CPE 106, incorporating aspects of the invention, is depicted as well.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 2. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

Figure 3:
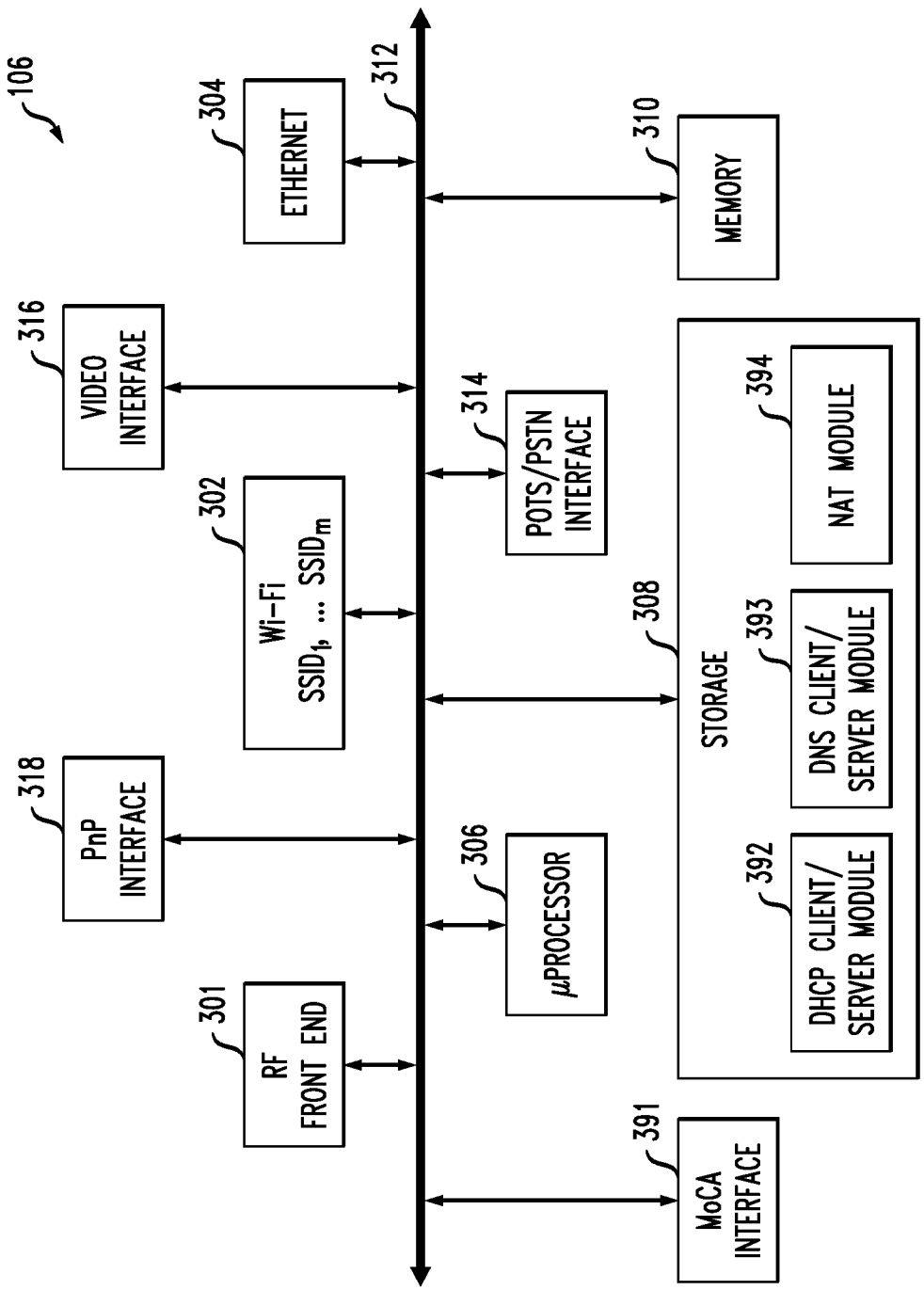
FIG. 3 is a functional block diagram of an exemplary centralized CPE unit configured in accordance with one embodiment of the invention.

FIG. 3 is a block diagram of one exemplary embodiment of the CPE 106 of FIG. 2. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. As will be discussed further below, in one or more embodiments, Wi-Fi interface 302 comprises a single wireless access point (WAP) running multiple ("m") service set identifiers (SSIDs). For the avoidance of doubt, in one or more embodiments, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

It is to be emphasized that every embodiment need not necessarily have all the elements shown in FIG. 3.

It will be recognized that while a linear or centralized bus architecture is shown as the basis of the exemplary embodiment of FIG. 3, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

It will also be recognized that the CPE configuration shown is essentially for illustrative purposes, and various other configurations of the CPE 106 are consistent with other embodiments of the invention. For example, the CPE 106 in FIG. 3 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 3; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In this fashion, content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

It will be appreciated, however, that the RF front end 301 of the CPE may comprise (either in addition to or in place of the cable modem) a traditional video RF front end 301 (e.g., tuner) adapted to receive video signals over, e.g., a QAM. For example, one exemplary embodiment of the RF front end 301 comprises one or more tuners, a demodulator, decryption module, and demultiplexer of the type well known in the art, although other configurations may be used. Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 2 and 3 acts as a Wi-Fi access point (AP), thereby allowing Wi-Fi enabled devices to connect to the home network and access Internet, media, and other resources on the network.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network.

The MoCA interface 391 can be configured, for example, in accordance with the MoCA 1.0, 1.1, or 2.0 specifications.

As discussed above, the exemplary Wi-Fi wireless interface 302 is, in some instances, also configured to provide a plurality of unique service set identifiers (SSIDs) simultaneously. These SSIDs are configurable (locally or remotely), such as via a web page.

Recall that, as discussed elsewhere herein, the IPv4 address space is becoming exhausted. Some IPv6 networks are a fixed /64 size including $2^{64}$ (18,446,744,073,709,551,616) IPv6 addresses. The notation "/" refers to the number of bits in the given prefix. That is, the size of a block of addresses is indicated by a slash (/) and the decimal size of the network prefix; the specific addresses in the block are not explicitly specified in this approach. For example, an address block with 48 bits in the prefix is indicated by /48. Such a block contains $2^{128-48}=2^{80}$ addresses. The smaller the numerical value of the network prefix, the larger the size of the block, since the prefix is subtracted from 128 to obtain the exponent to which two is raised to determine the number of available addresses. For example, a /56 prefix is four times larger than a /58 prefix ($2^{128-56}=2^{72}$ addresses; $2^{128-58}=2^{70}$ addresses; $2^{72}=2^{70}\times 4$).

In general, an IPv6 network can be an arbitrary size, with the bit length of the network determining the number of hosts available in a similar way to IPv4 Classless Inter-Domain Routing (CIDR) (a method for allocating IP addresses and routing Internet Protocol packets) addressing. By convention a home IPv6 network will be of size /64 or lower (e.g. /63, /56, etc.), but embodiments of the invention are not so limited unless expressly recited in the claims.

The skilled artisan will be familiar with IPv4 and IPv6 per se. IPv6 specifies a new packet format, designed to minimize packet header processing by routers. IPv6 includes a larger address space, enhanced multi-casting, stateless address auto-configuration (SLAAC), mandatory support for network layer security, simplified processing by routers, enhanced mobility, options extensibility, and support for so-called "jumbograms."

One or more embodiments advantageously enhance or even optimize on-demand IPv4 address provisioning to a residential gateway internet access router in a manner that decreases the time necessary to complete the address assignment relative to when the residential gateway router must use it to send data on the end user's behalf.

As unique IPv4 addresses become scarcer, Internet Service Providers worldwide will be looking for ways to extend the use of their current IPv4 address allocations. As noted above, some ISPs may choose to employ Carrier-grade Network Address Translation (CGN).

One or more embodiments provide faster and more reliable on-demand IPv4 address provisioning to share addresses among multiple customers, in turn leading to a better customer experience for users of a Home Internet Gateway Router or the like.

In most residential broadband networks, the connection is "always on" between the user's computer, the user's home gateway internet access router, and the broadband internet service provider. This enables nearly instantaneous connection to sites and services which can be reached via the Internet or some other internet (as used herein, Internet with the capital "I" is the global Internet, while "internet" is a generic description of any inter-network of computer systems and routing topologies). Typically, each host connected to this network always has an IPv4 address allocated for its exclusive use whenever it is online. However, as IPv4 addresses become scarcer due to the exhaustion of the remaining unique IPv4 address space globally, Internet Service Providers are looking for ways to share their current allocations of addresses among multiple customers. As noted, currently, this is typically accomplished via Carrier-Grade Network Address Translation.

One or more embodiments provide techniques that allow broadband ISPs to share a single address among several customers. One of the alternative ways to do this is to oversubscribe the address—that is, assume that not all of the users associated with that single address will need to actually use it at any given time. In this situation, ISPs allocate an IPv4 address to a customer during periods of activity, and then reclaim it when the data transfer goes idle so that it is available for another customer's use.

In some situations, the home gateway only requests an IPv4 address when it detects data (IP packets) from one of its connected hosts destined for the external network, and releases the address when it is idle. Refer to Internet Engineering Task Force, Fleischhauer & Bonness, Internet-Draft, Deutsche Telekom AG, Sep. 7, 2011, "On demand IPv4 address provisioning in Dual-Stack PPP deployment scenarios," the complete disclosure of which is expressly incorporated herein by reference in its entirety for all purposes. Furthermore in this regard, Point-to-Point Protocol (PPP) is used in the data link layer on many DSL connections. The IETF, in the just-mentioned Internet Draft, has come up with a way to carry out IPv4 provisioning on demand for a PPP connection; in essence, it deals with the act of adding or removing an IPv4 address to the WAN side of the connection on the router.

Using outbound packets as the trigger to request an address requires the home gateway to request and receive an IPv4 address from the ISP's infrastructure before it can send these packets to their destination. It must buffer (store in memory) the packets while it waits for an address, and depending on how long that address allocation activity takes, the packets waiting to be sent to their end destination may exceed their timeout value (expire), causing the connection to fail, which creates a poor user experience. Please see discussion of FIGS. 16-24 below.

One or more embodiments advantageously reduce the time between the trigger and the receipt of an address by using clues to determine preemptively that an IPv4 address needs to be allocated to the home gateway router and to request it before the end host actually sends the connection attempt. This preferably results in a near-seamless transition from idle to active with no end-user impact or knowledge.

A non-limiting exemplary embodiment will now be described. Initial reference should be had to FIG. 4. The home gateway router 4008 usually acts as a local Domain Name Service (DNS) resolver 4010. Hosts 4004, 4006 in the user's network 4002 send queries to it to translate Fully Qualified Domain Names (FQDNs) such as 4022 in FIG. 5 into IP address identifiers, which are what is used for Internet communication between two hosts. The home gateway router 4008 receives those queries from the local host, and then sends them to an upstream server 4016 in the Internet Service Provider's network 4014, which then moves recursively through the FQDN to determine the correct server to query for a response. It passes this down to the home gateway router 4008, which then passes it to the end host 4022.

The ISP DNS server 4016 could, as seen at 3303 in FIG. 1A, be located in the head-end 150. However, it can also be located in a variety of other places. For example, it could be either further distributed or more centralized. It functions as a recursive caching name resolver that residential and/or commercial customer networks are configured to use as their DNS server. The DHCP server 3304, discussed further below, receives the request for an IPv4 address from the CPE router and either defers the request or assigns an address as necessary.

There are two different types of DNS records which will be discussed herein. Records providing an IPv4 address that maps to the FQDN are called A records (see FIGS. 16-24 and 25-31), and records for an IPv6 address are called AAAA (quad-A) records (see FIGS. 6-15).

In one or more embodiments, an IPv6-capable client (for example, a PC 4004) behind the home gateway router 4008 makes a DNS query to the home gateway router for "www dot example dot com" as seen at 4022. The home gateway router does its recursive query, and will receive an AAAA record, an A record, or both. In the event that an AAAA record is received, the end host will make the connection to the desired address of destination site 4012 using IPv6, and an IPv4 address will not be needed to complete the connection. This is described in greater detail below with respect to FIGS. 5-15.

As an aside with regard to recursive querying, in some instances, the home gateway router 4008 serves as a DNS query forwarder. The hosts 4004, 4006 behind its network point to it as a DNS server 4010. Home gateway router 4008 with DNS server 4010 passes queries to the ISP's DNS server 4016; effectively serving as a shim DNS. In this aspect, home gateway router 4008 with DNS server 4010 does not perform full recursion. A more complex approach is also possible, with a full recursive DNS server implemented in the gateway 4008. In this case, where DNS server 4010 of home gateway router 4008 has full recursion capability, it can obtain an address directly from the destination site 4012.

Now continuing, in the event that both A and AAAA records are received, in one or more embodiments, the host will (by policy) prefer an IPv6 address, and an IPv4 address will not be needed to complete the connection. Thus, this scenario would also proceed as shown in FIGS. 5-15.

However, if only an A record is received, usually because the desired destination 4012 does not support IPv6 yet, the client 4004 will initiate a connection using IPv4, which means that the home gateway router 4008 will now need an IPv4 address allocated to it from the ISP.

In the current proposals, described with regard to FIGS. 16-24, the home gateway router will wait until it detects IPv4 packets from the end host destined for an external server before requesting an IPv4 address, meaning that it must buffer those initial connection attempts until it receives and configures the IPv4 address from the ISP. If this doesn't happen fast enough, the connection may time out, causing a failure in the operation attempted by the end user.

In one or more embodiments (see, e.g., FIGS. 25-31), advantageously, the home gateway router or other DNS server in the Internet Service Provider network can watch for the presence of an A record in the response to DNS queries from end hosts, and use the receipt of an A record to trigger the request for an IPv4 address allocation sooner. Essentially, the home gateway router can make the logical assumption that because the end host has just been told that the only way to reach the destination it desires is via IPv4 (because only an A record was returned), if it does not already have an IPv4 address, it needs to request one in order to be prepared to send traffic when the end host attempts to initiate the connection with its desired destination. With this clue available, as the end host is preparing to send the first connection attempt packets, the home gateway router is also requesting an address. Ideally, the home gateway router completes that request and configuration before the end host sends the first packets, and therefore can immediately send the packets to their next hop. If this doesn't happen, the home gateway router will still have to buffer the packets, but there is a lower likelihood, as compared to current techniques shown in FIGS. 16-24, that it must buffer them long enough to risk a timeout and connection failure.

Figure 4:
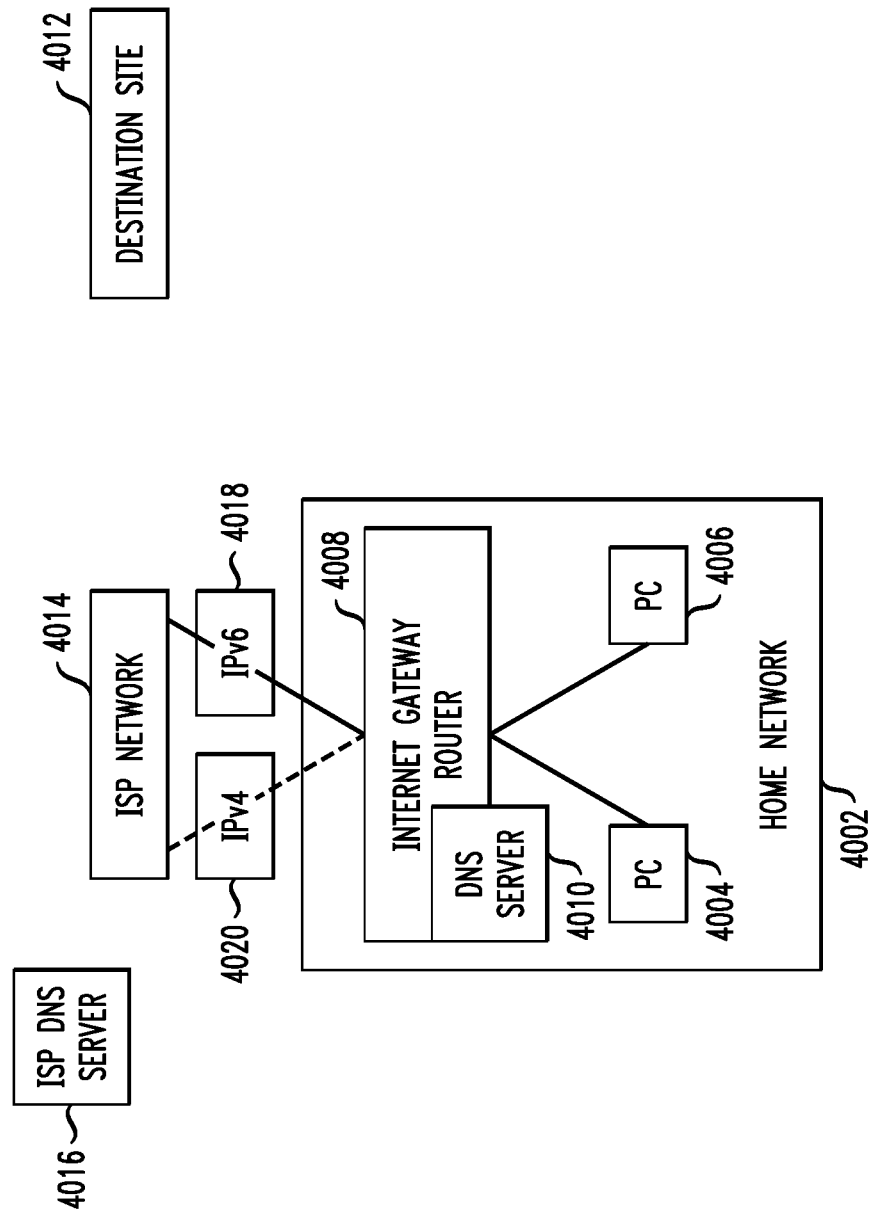
FIGS. 4-15 depict a system, in accordance with an aspect of the invention, accessing an IPv6 destination site.

One or more embodiments are applicable to a variety of scenarios; for example, a residential or small business cable or digital subscriber line (DSL) subscriber, or other consumer of residential or small business broadband. However, embodiments of the invention are not limited to residential or small business broadband and have general applicability in any situation where the customer network is using dynamically-assigned addresses. In any event, many subscribers have multiple devices behind their home or other network, as seen in FIGS. 2 & 4, for example. The subscribers typically have DSL or a cable modem and a wired or wireless router that performs network address translation (NAT) so that it is using just one IPv4 address on the outside for connectivity towards the Internet or other internet, and then inside the home or other premises there may be an entire network of devices that are using a separate set of IP blocks.

It is also worth noting at this point that embodiments of the invention are not limited to the case of a single top-level, and can be utilized in situations having multiple exits to the network; wherever the external addresses being used on the NAT device(s) are dynamically, rather than statically assigned by the service provider (SP).

As networks move towards IPv6, rather than replacing IPv4, there will likely be an additional set of addresses; in essence, there will be two fundamentally separate network stacks like "ships in the night"—they pass each other all the time but they do not interact. If this is taken to its logical conclusion, as more and more of the user devices in the home and the content on the Internet start moving towards IPv6, less IPv4 will be needed—indeed, as IPv6 becomes available, it will be preferred. At some point, every customer will no longer need IPv4 constantly, so that it may be possible to share addresses among customers. One or more embodiments advantageously provide techniques for on-demand IPv4 use.

Currently, equipment "wakes up" and communicates with equipment of an MSO or other provider and asks for an IPv4 address; the equipment keeps the IPv4 address until it is turned off. The same thing currently happens in the user's home network—the user's personal computers or other networked devices wake up and ask their local network for an IPv4 address, and they keep that IPv4 address for the entire time that they are on the network.

One or more embodiments advantageously provide IPv4 service that is not necessarily always on in a manner that is still transparent to the customers. In some instances, the local network is separated from the remote network, and an active IPv4 network is kept up locally behind the gateway router or the like. However, one or more embodiments do not necessarily have to have an active IPv4 connection out to the broadband provider.

One or more embodiments provide techniques to jump from the state where there is an active IPv6 connection out to the ISP but there is not an active IPv4 connection. As discussed below in connection with FIGS. 16-24, without such techniques, when a customer seeks to make a connection to an IPv4 web site, or do something else on the Internet that has to be done with IPv4, his or her local PC initiates a connection to the local router and the local router notices that it is IPv4 traffic and the local router realizes that it needs an IPv4 address so that it can send it out on the wire towards the Internet or other internet. It can then make the request to the broadband provider's Dynamic Host Configuration Protocol (DHCP) server to get an address assigned. This must all happen fast enough so that the attempt to connect does not time out and fail. Even the fastest of turnarounds makes this unlikely to succeed; what typically happens is that the first attempted connection with IPv4 service when there is not active IPv4 on the WAN (internet) side results in user timeouts. The user will notice this and it will cause a service impact to the user.

One or more embodiments make use of context clues to preemptively request the IPv4 address such that when the actual request is received it can be handled quickly enough to avoid a timeout failure. In one or more embodiments, the local router 4008 can conduct DNS, either IPv4 or IPv6, as seen at 4010. Local router 4008 sees the request and it makes the query upstream to the DNS servers 4016 over IPv6 so that it does not initially need an active IPv4 connection. When local router 4008 gets a response back it may:
1. obtain a quad A record (AAAA-record)—an IPv6 DNS response; or
2. obtain an A-record which is an IPv4 DNS response.

A quad-A record means that the end host will use IPv6 and an active IPv4 connection is not needed so it can remain IPv6 only. On the other hand, if it receives (only) an A-record back, the router can, in essence, anticipate that an IPv4 connection will shortly be required. It can, at that moment, trigger a request for an IPv4 address while it is responding to the end host with the address that the end host needs to initiate a connection to. Because this is happening in parallel, IPv4 connectivity will preferably be available by the time the end host initiates the connection.

Figure 5:
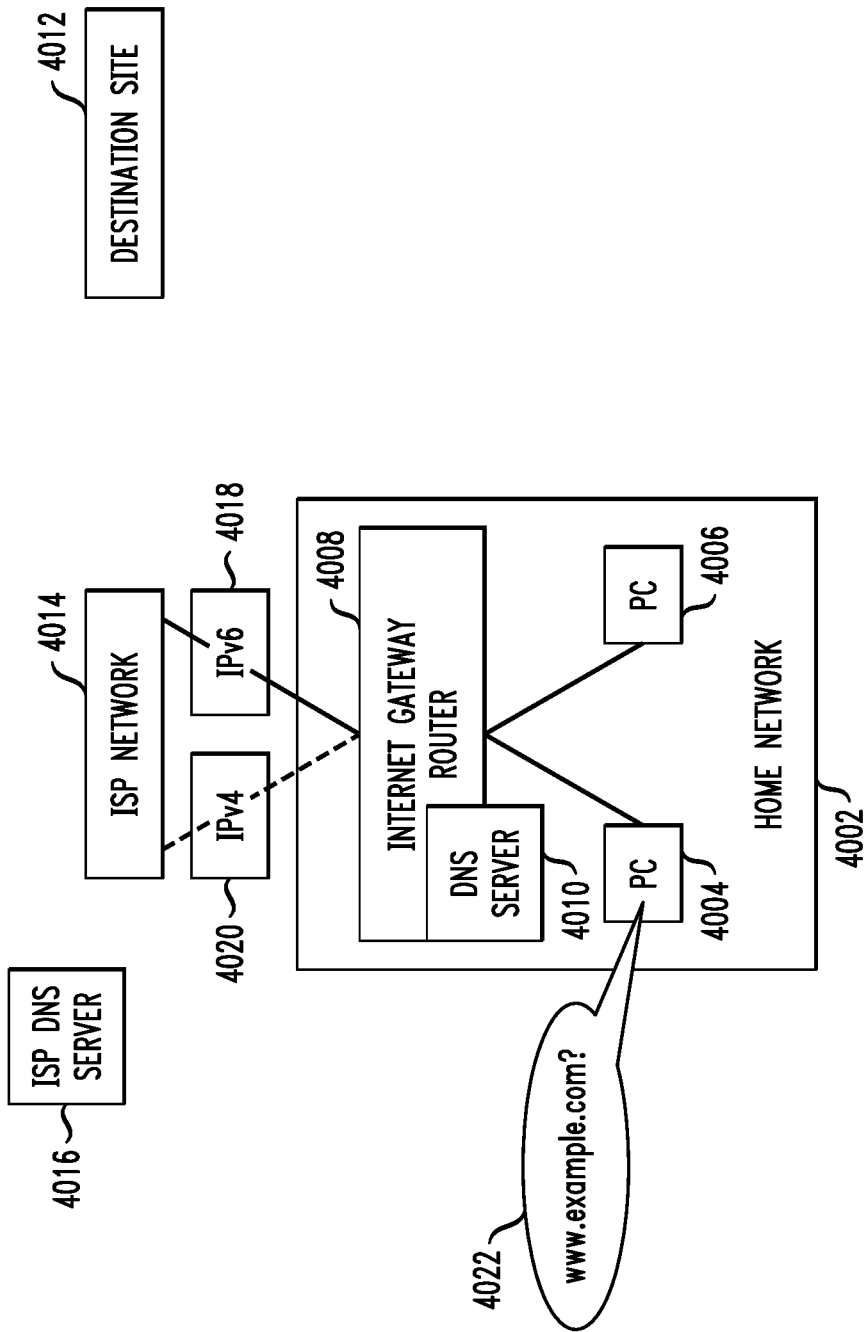

Refer now to FIGS. 4-15 which depict an exemplary system, according to an aspect of the invention, making an IPv6 connection. Home network 4002 includes home gateway router 4008 (also referred to as an Internet Gateway Router) which acts as a local Domain Name Service (DNS) resolver 4010. Router 4008 connects downstream to a suitable LAN (home network 4002) and upstream to an ISP's network 4014 for access to the Internet or another internet. In the example of FIG. 5, the home network 4002 is a wired network with personal computers (PCs) 4004, 4006; however, the home network could be wired, wireless, or both, and the devices could include PCs, laptops, tablets, smart phones, and a variety of other devices. Both IPv4 and IPv6 connections 4020, 4018 respectively are available to ISP Network 4014.

FIG. 4 (first figure) shows the IPv4 connection 4020 as a dashed line because it is not an active connection. IPv6 connection 4018 is active and is shown as a solid line. This convention is used throughout FIGS. 4-31.

Figure 6:
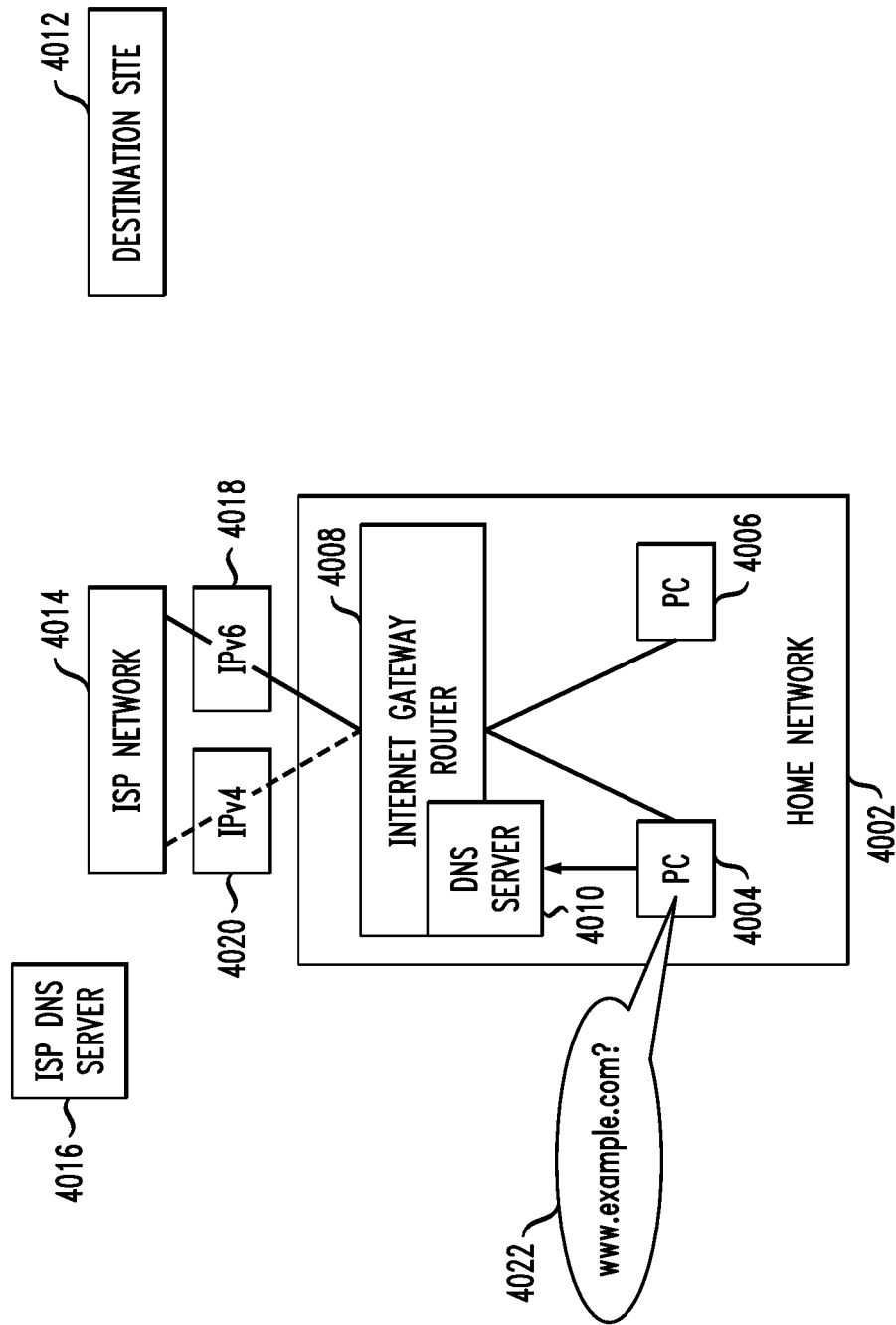
Figure 7:
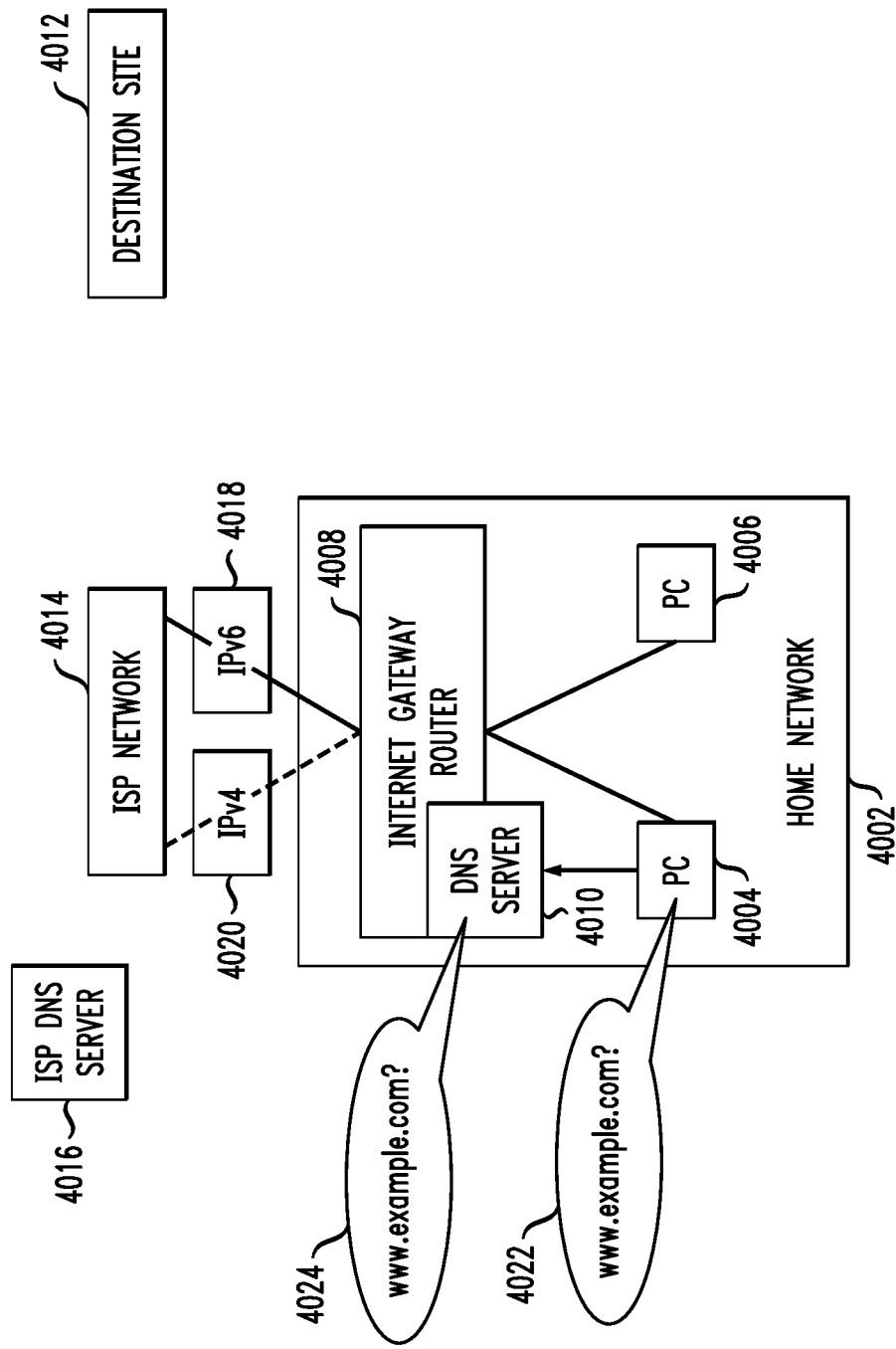
Figure 8:
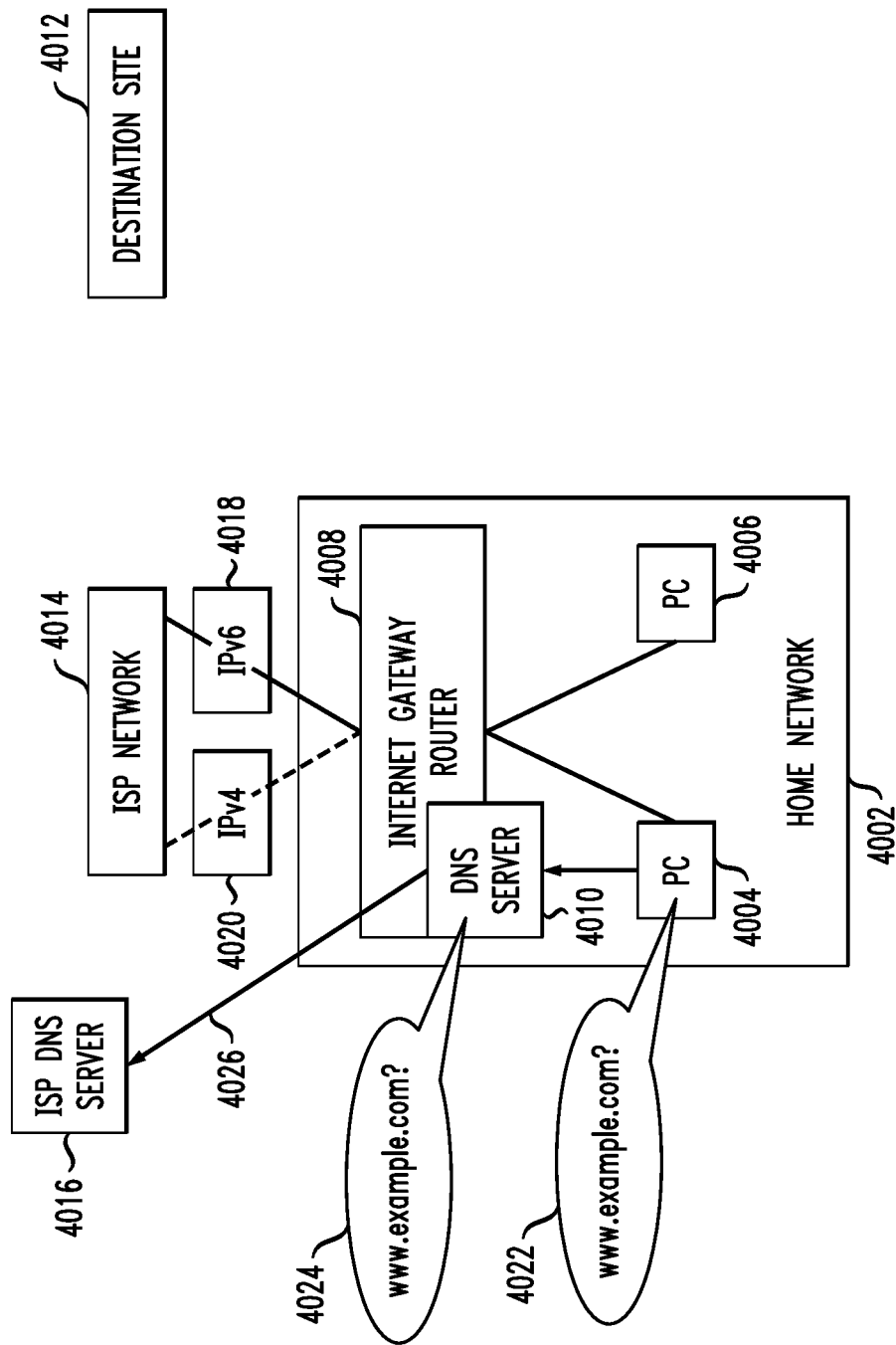

At 4022, FIG. 5 shows one of the PCs 4004 trying to connect to www dot example dot com; for example, a user someone types that URL into a browser program on PC 4004. As seen in FIG. 6, PC 4004 queries the local DNS server 4010 in the internet gateway router 4008, as indicated by the arrow from the PC to the local DNS server. As seen at 4024 in FIG. 7, the local DNS server 4010 is now looking for www dot example dot com. Referring then to FIG. 8, local DNS server 4010 makes a query out to the ISP's DNS server 4016 to get the information, as indicated by the arrow 4026 from the local DNS server 4010 to the ISP's DNS server 4016.

Figure 9:
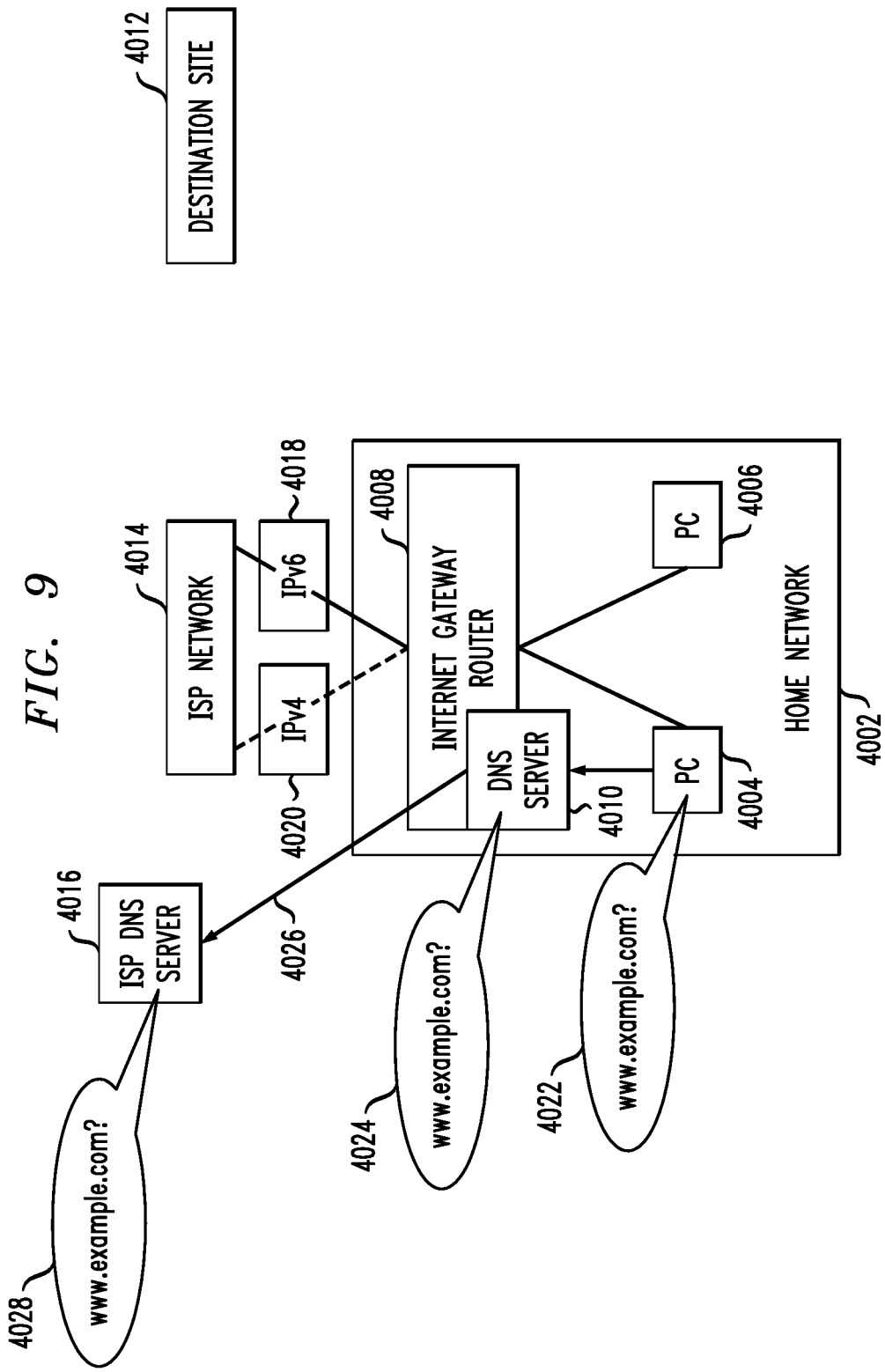
Figure 10:
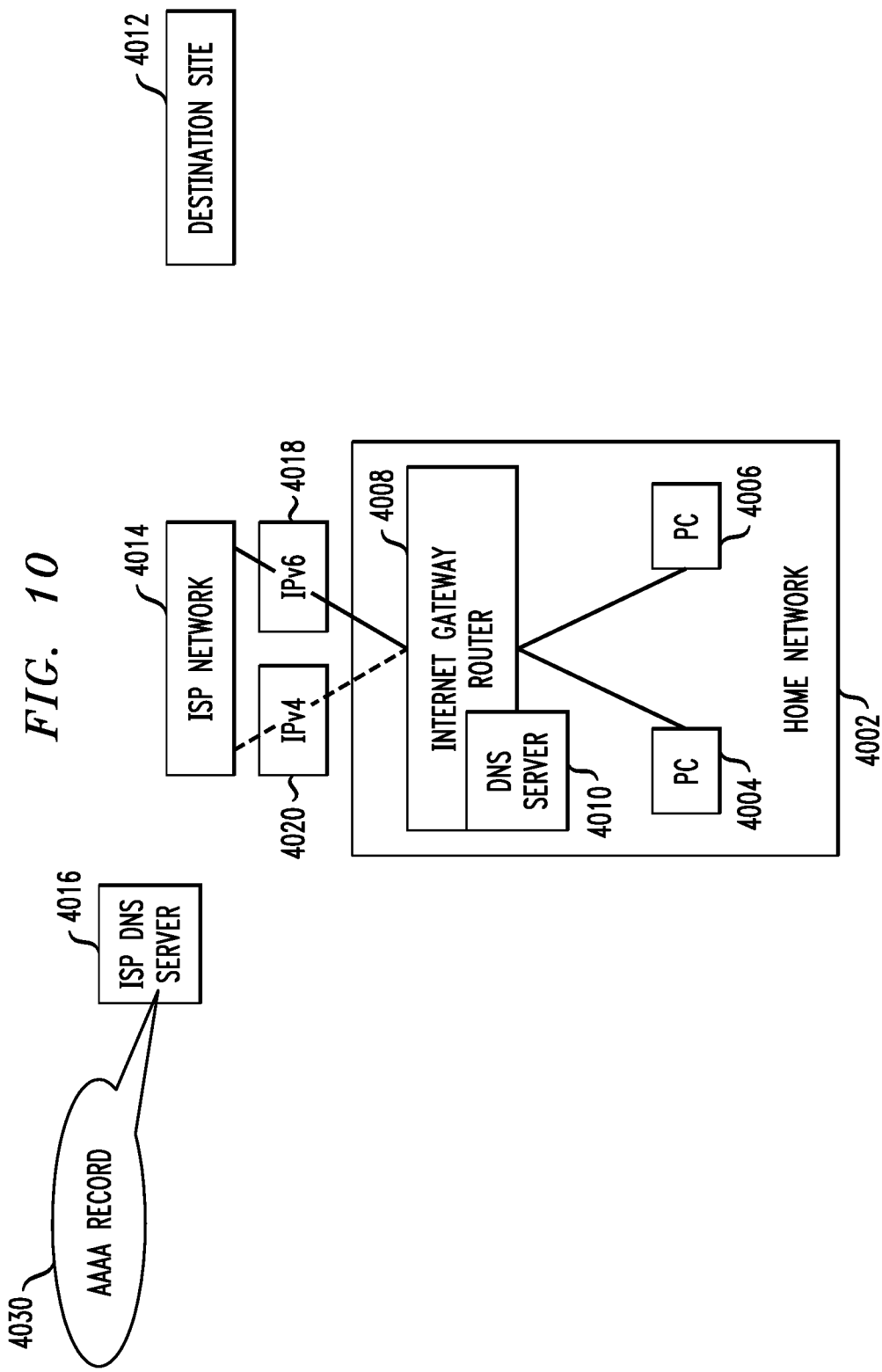
Figure 11:
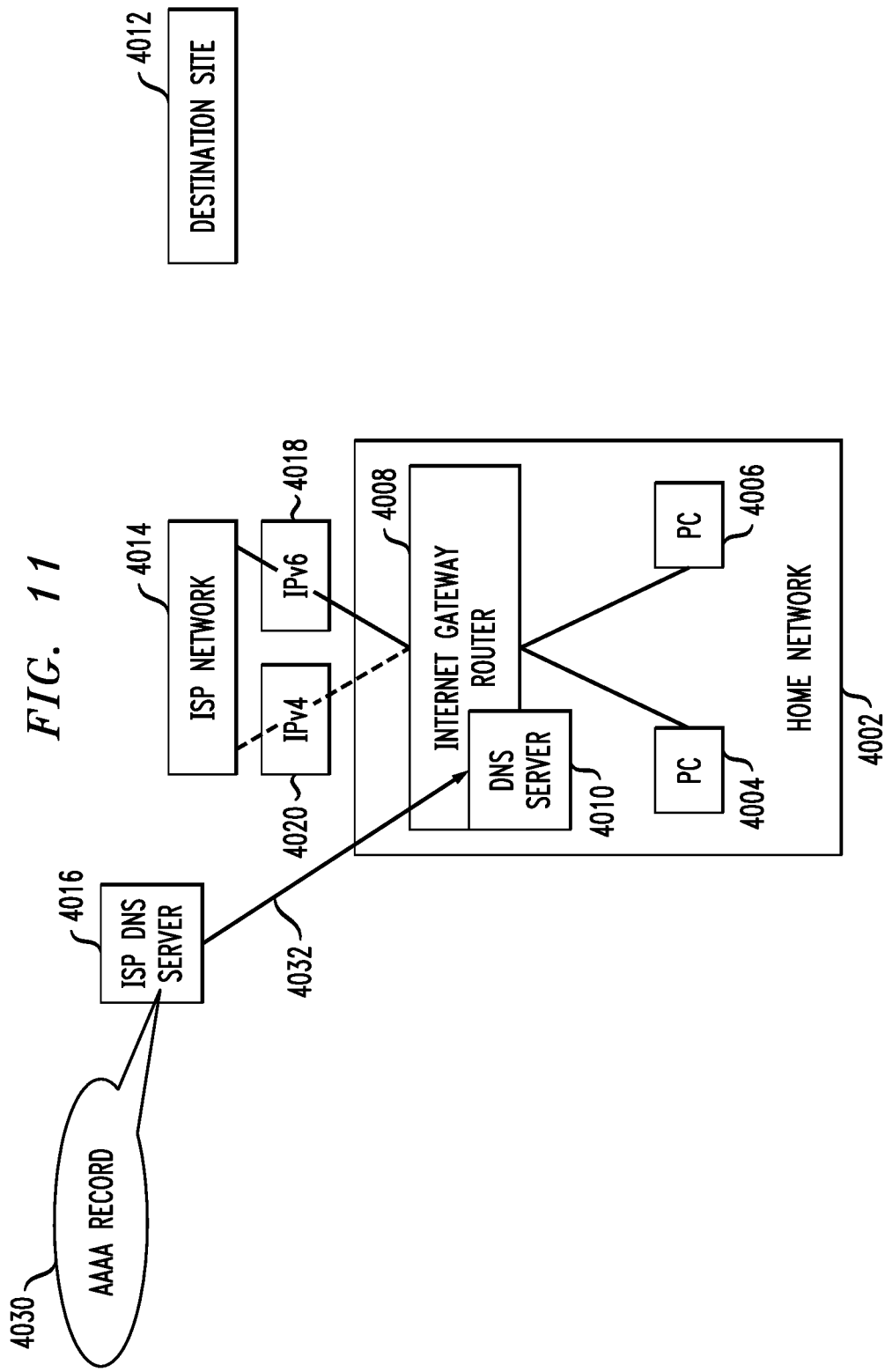

At 4028 in FIG. 9, the ISP's DNS server 4016 is searching for www dot example dot com. FIG. 10 shows a quad-A record 4030 coming out of the ISP's DNS server 4030. FIG. 11 shows the ISP's DNS server 4016 responding back to the local DNS server 4010 in the Internet gateway router 4008, as indicated by the arrow 4032 depicting the ISP's DNS server 4016 responding back to the local DNS server 4010 in the Internet gateway router 4008.

Figure 12:
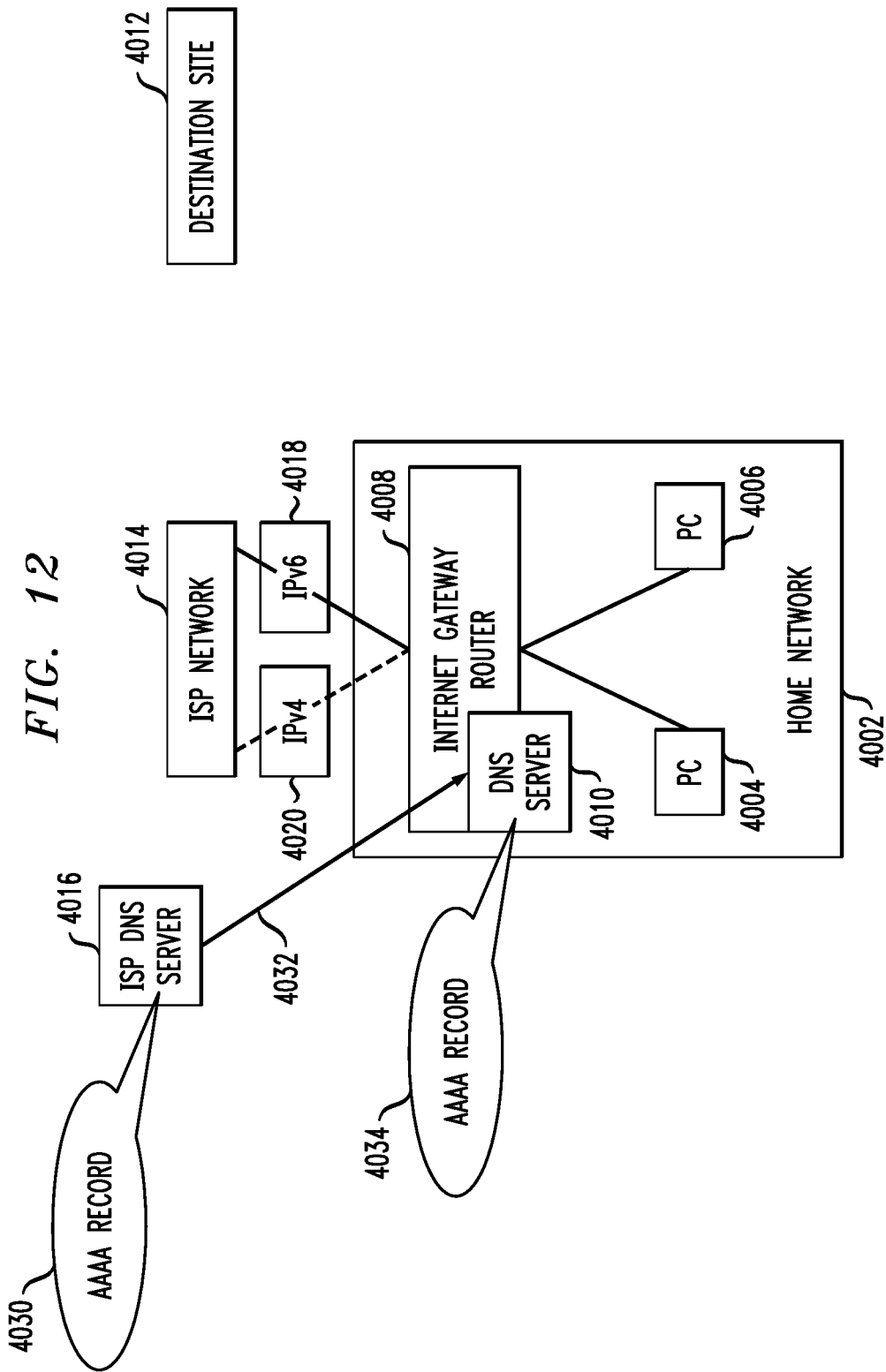
Figure 13:
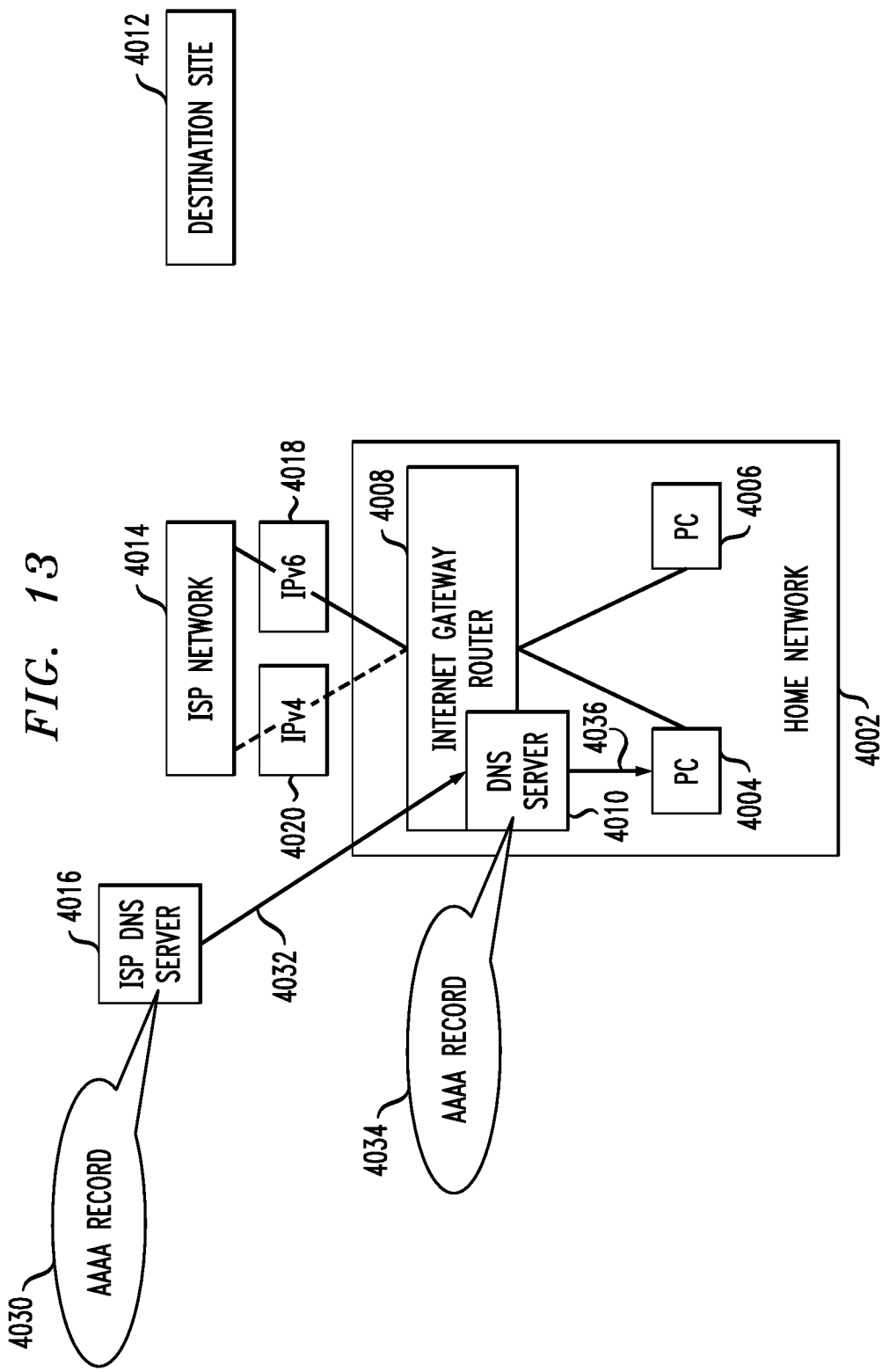
Figure 14:
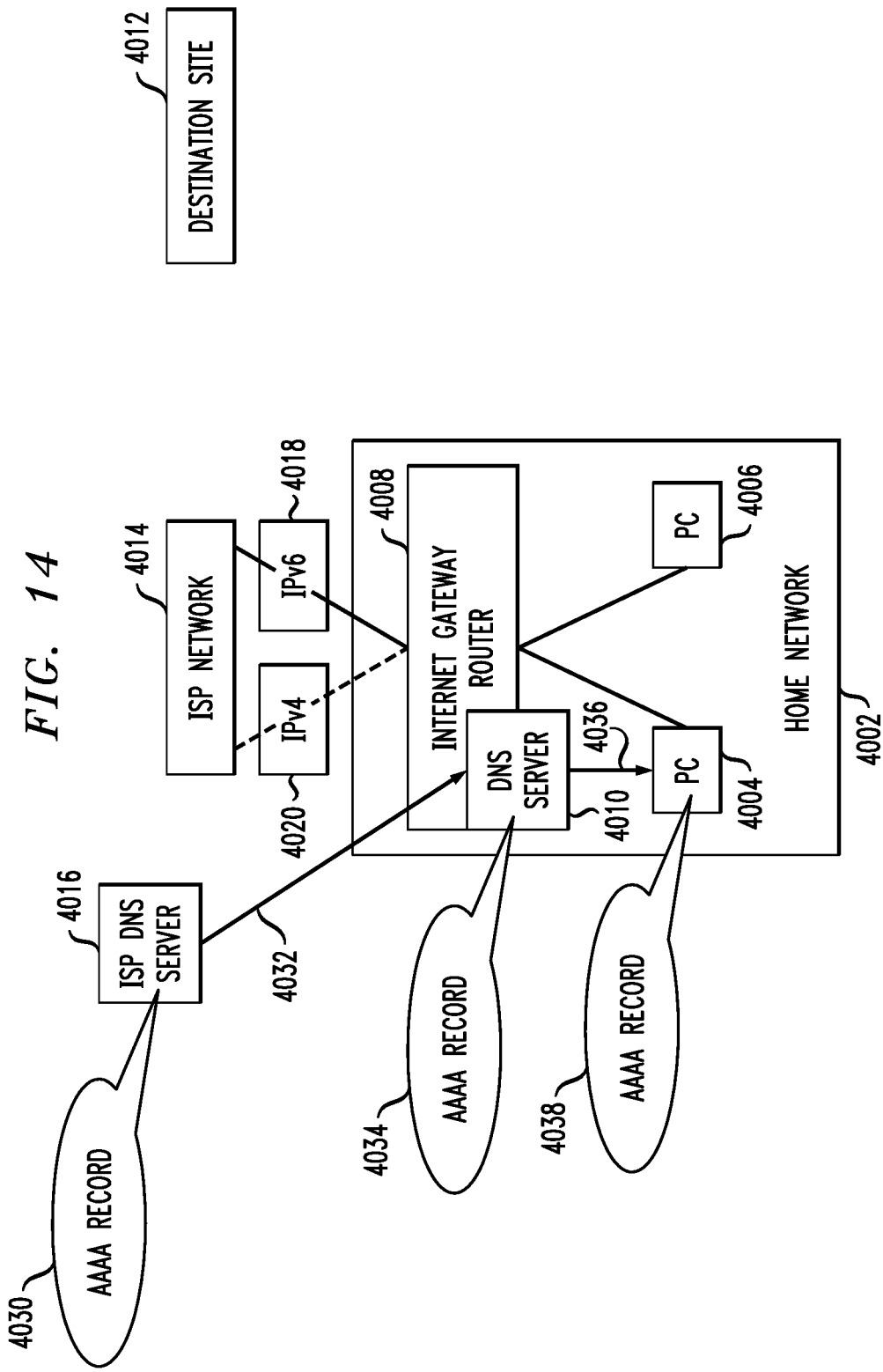
Figure 15:
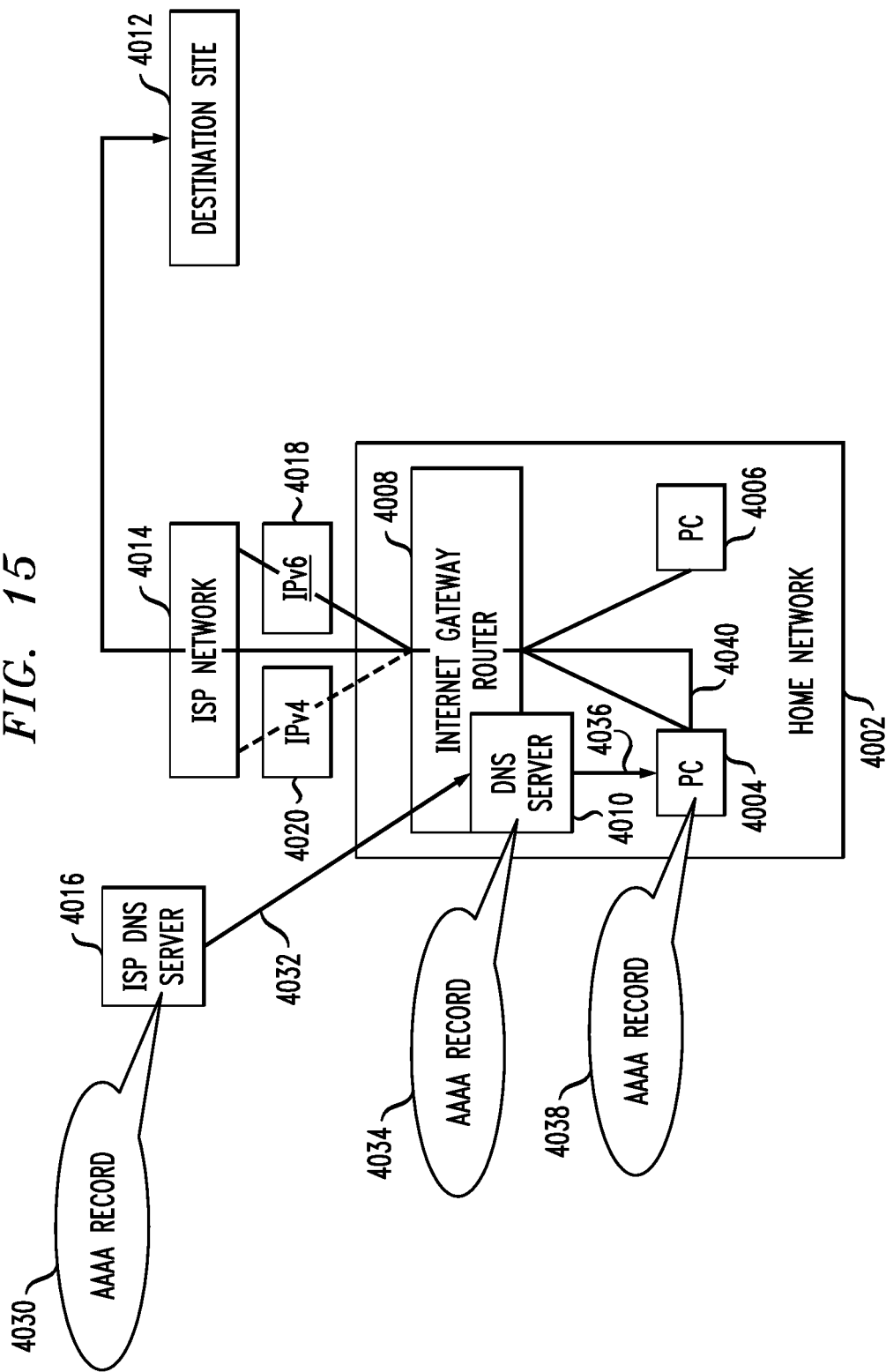

In FIG. 12, the local DNS server 4010 now "sees" the quad-A record, as shown at 4034. In FIG. 13, the local DNS server 4010 now hands the quad-A record down to the PC 4004, as indicated by the arrow 4036 from the local DNS server 4010 to the PC 4004. At 4038, FIG. 14 shows the PC with the quad-A record. FIG. 15 shows the PC 4004 initiating a connection 4040 to the destination site 4012 via IPv6.

FIGS. 4-15 thus depict an ideal situation where IPv4 is not employed. In this regard, reference character 4012 is used herein to generally refer to a destination site, regardless of whether the same is IPv4, IPv6, or both. Furthermore, DNS server 4010 and router 4008 shown in FIGS. 4-15 are configured in accordance with aspects of the invention to implement techniques shown in FIGS. 25-31; however, the sequence of communications shown in FIGS. 4-15 could also be carried out with a conventional DNS server and router.

Figure 16:
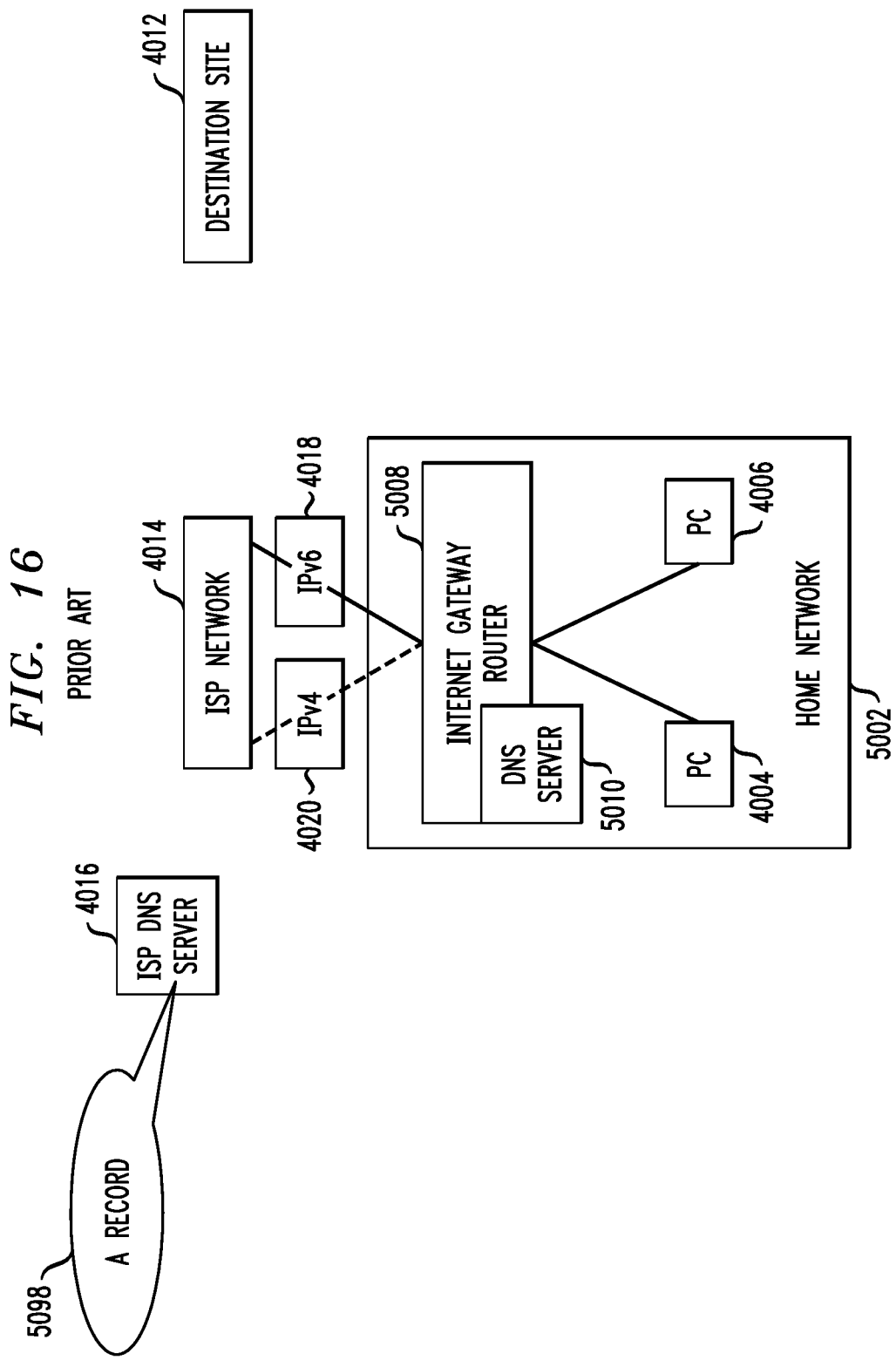
FIGS. 16-24 depict a system, according to the prior art, attempting to access an IPv4 destination site.
Figure 17:
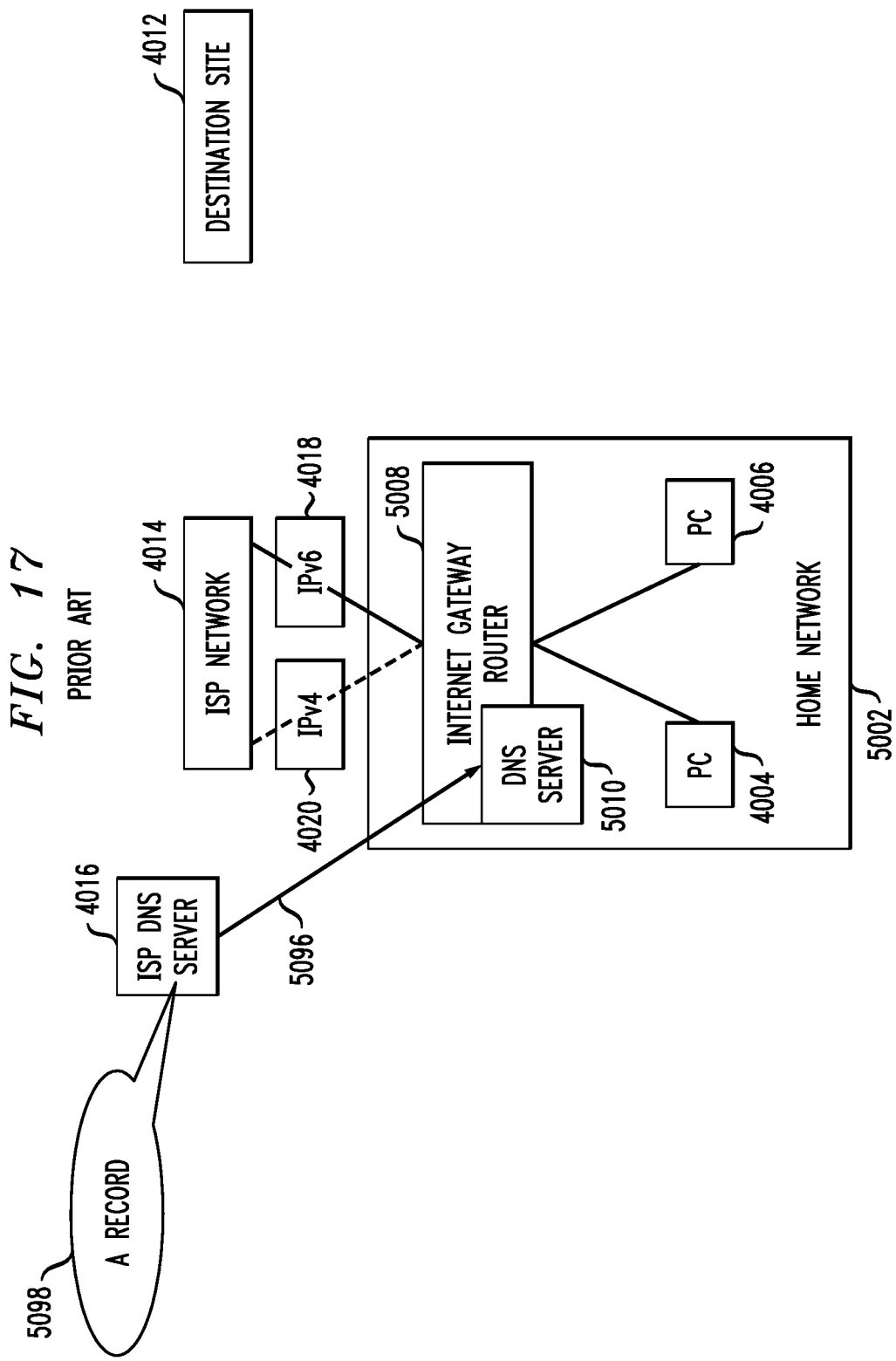
Figure 18:
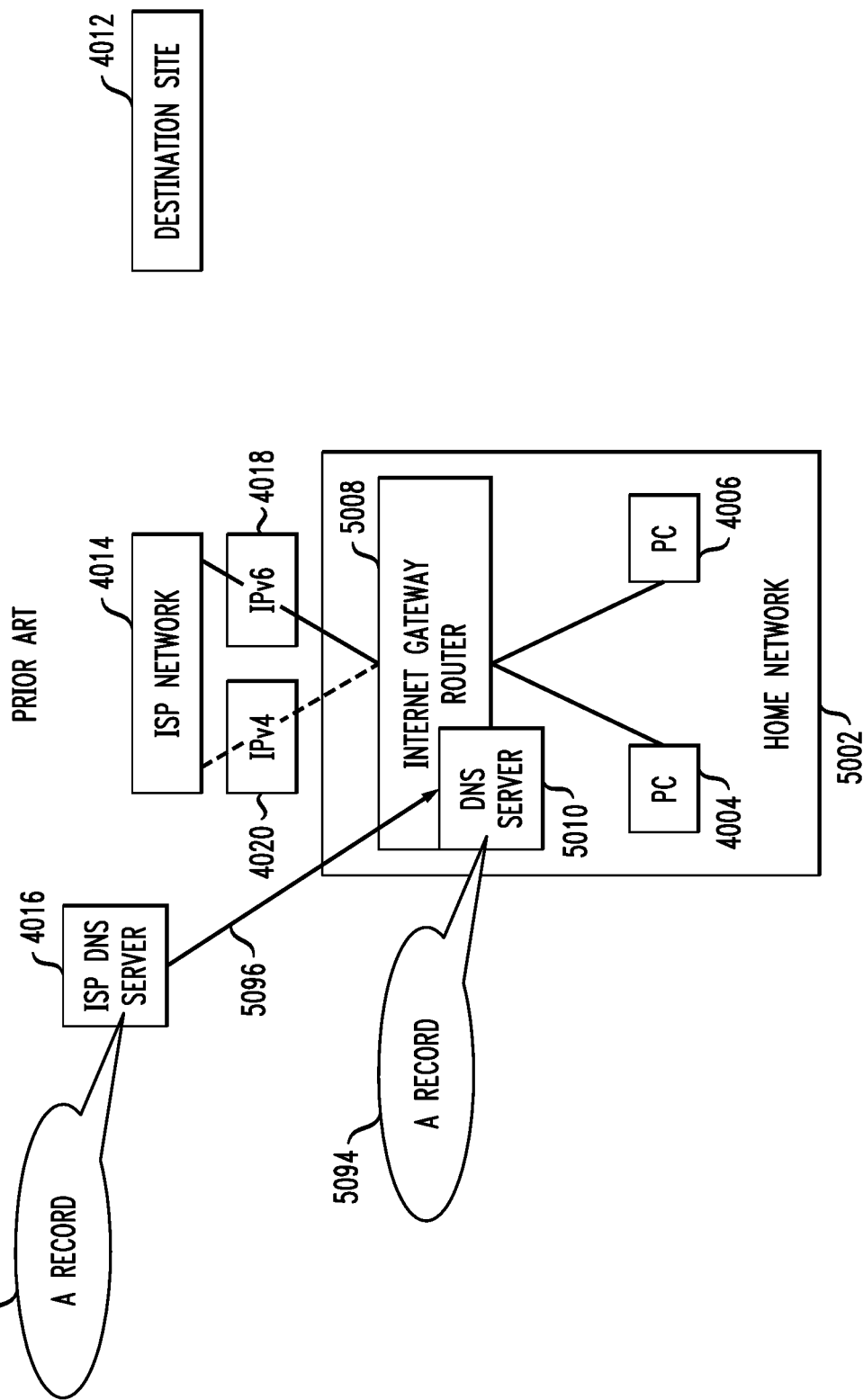
Figure 19:
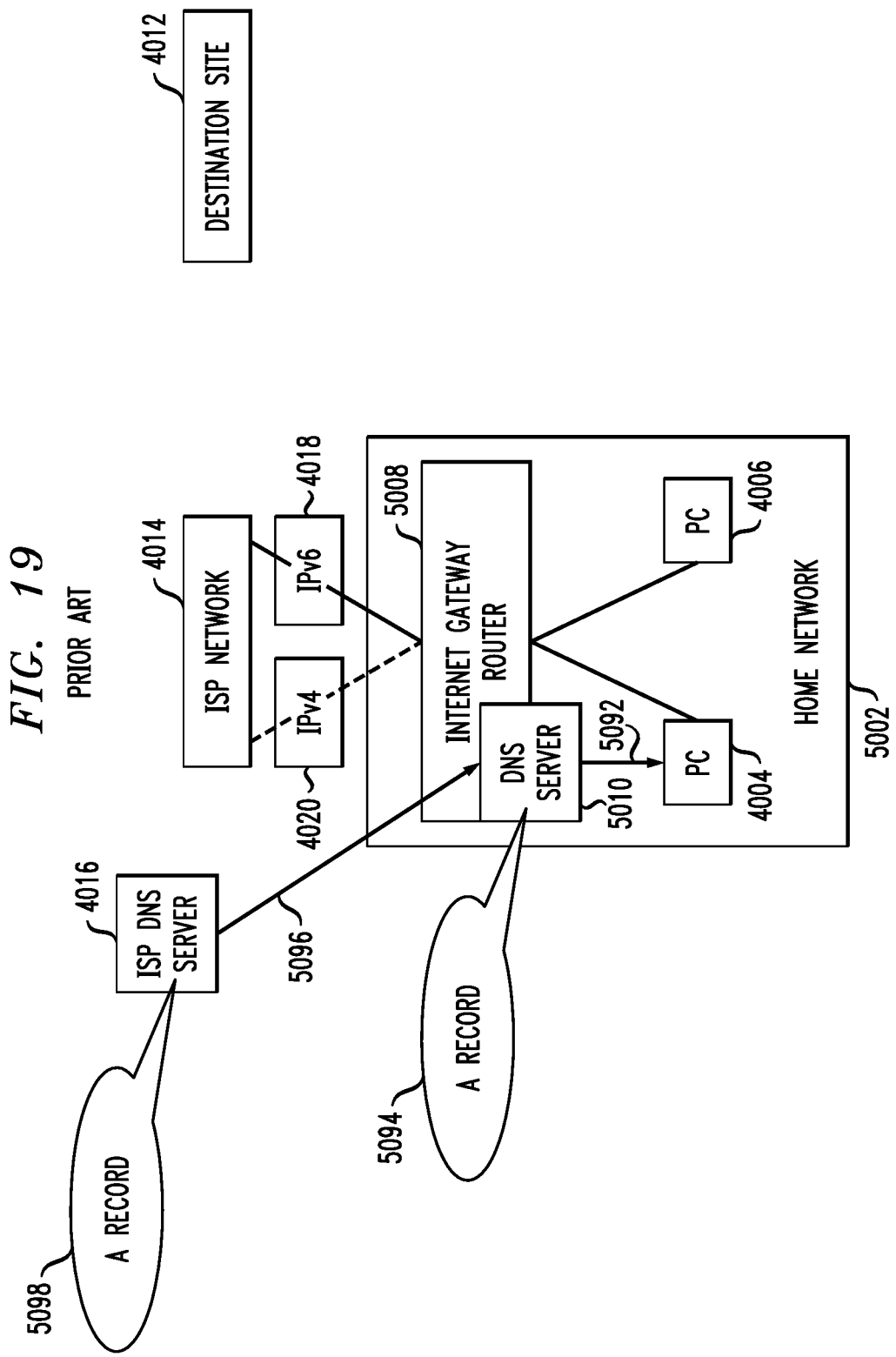

FIGS. 16-24 show an attempted IPv4 connection in a system not employing techniques of the invention, i.e., using a conventional DNS server 5010 and router 5008. Elements with the same reference character are similar to those in FIGS. 4-15. Home network 5002 differs from network 4002 in that DNS server 5010 and router 5008 are conventional, as noted above. In FIG. 16, the ISP's DNS server 4016 has an A-record, as seen at 5098. In FIG. 17, the ISP's DNS server 4016 sends the A-record to the local DNS server 5010, as seen at arrow 5010. In FIG. 18, the local DNS server has the A-record, as seen at 5094, and in FIG. 19, it hands the A-record down to the PC, as seen at arrow 5092.

Figure 20:
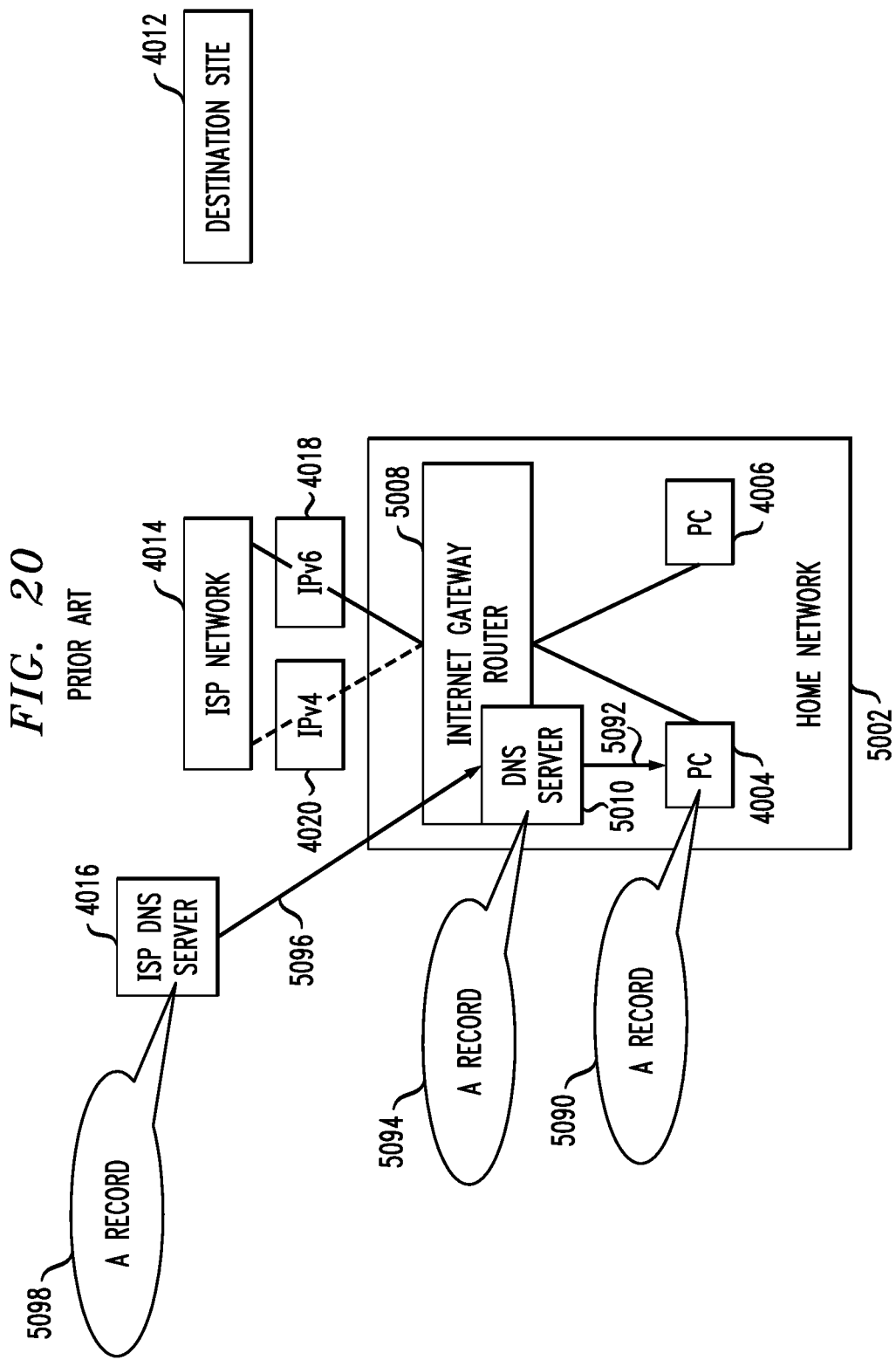
Figure 21:
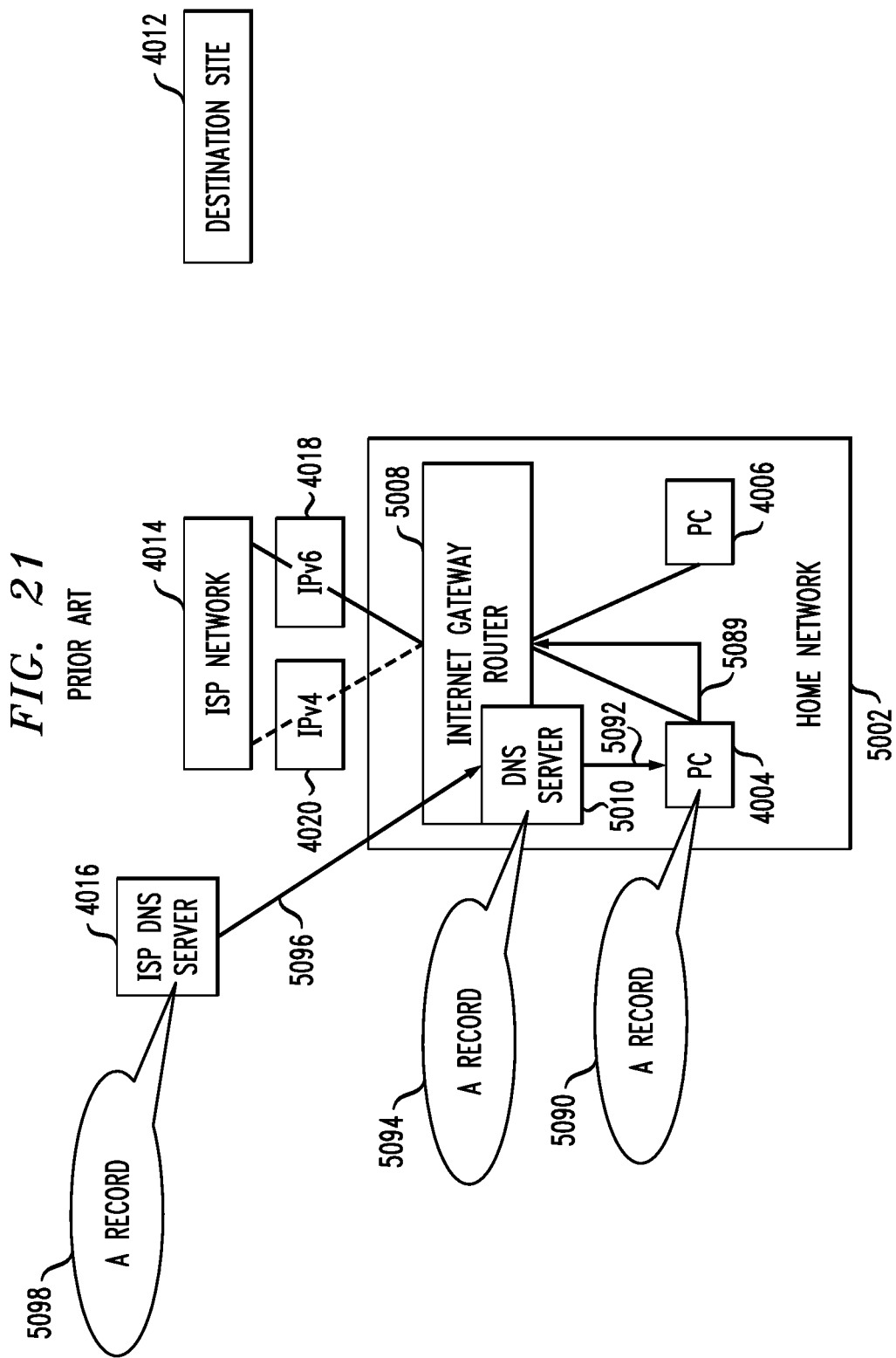
Figure 22:
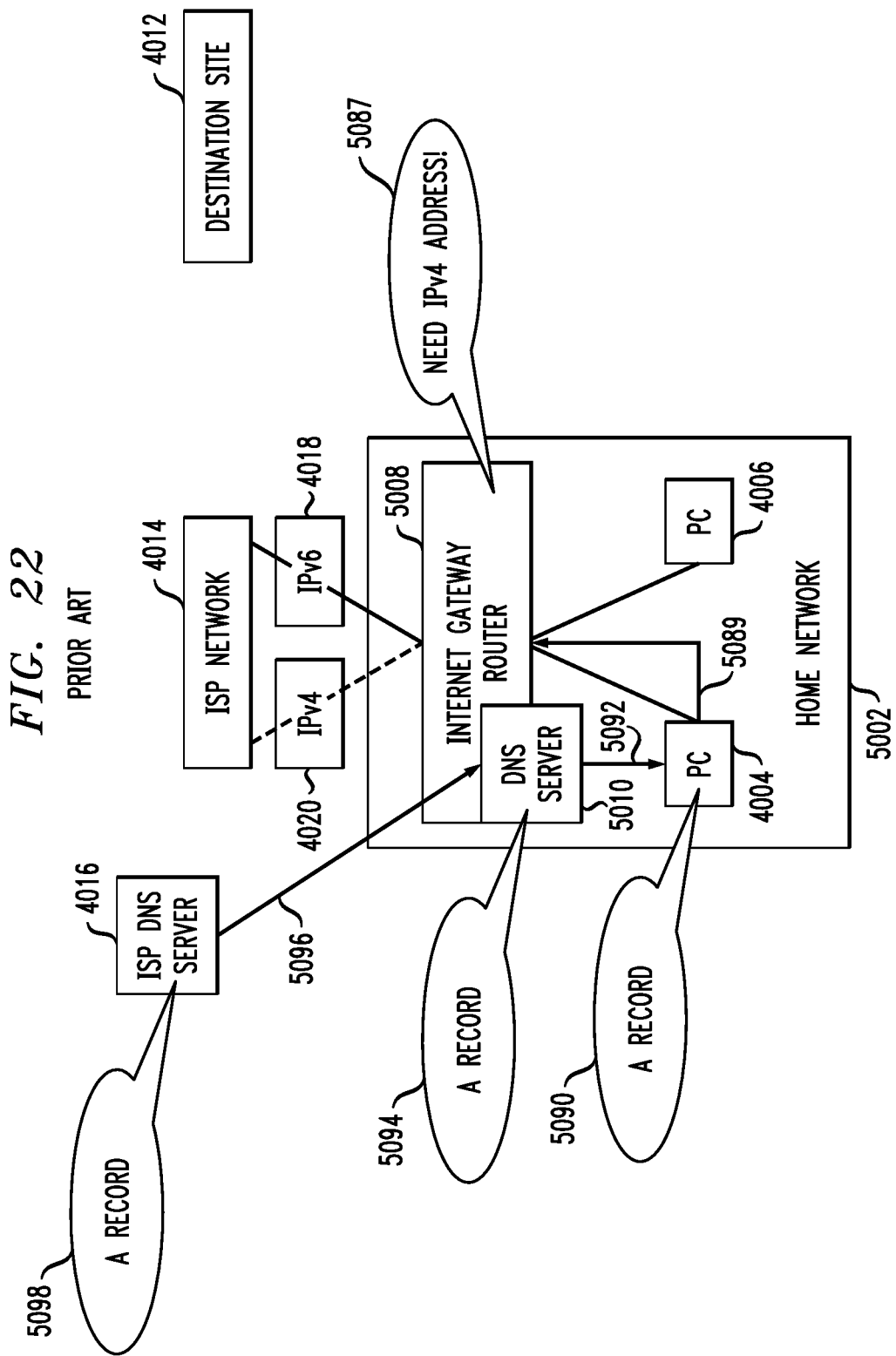
Figure 23:
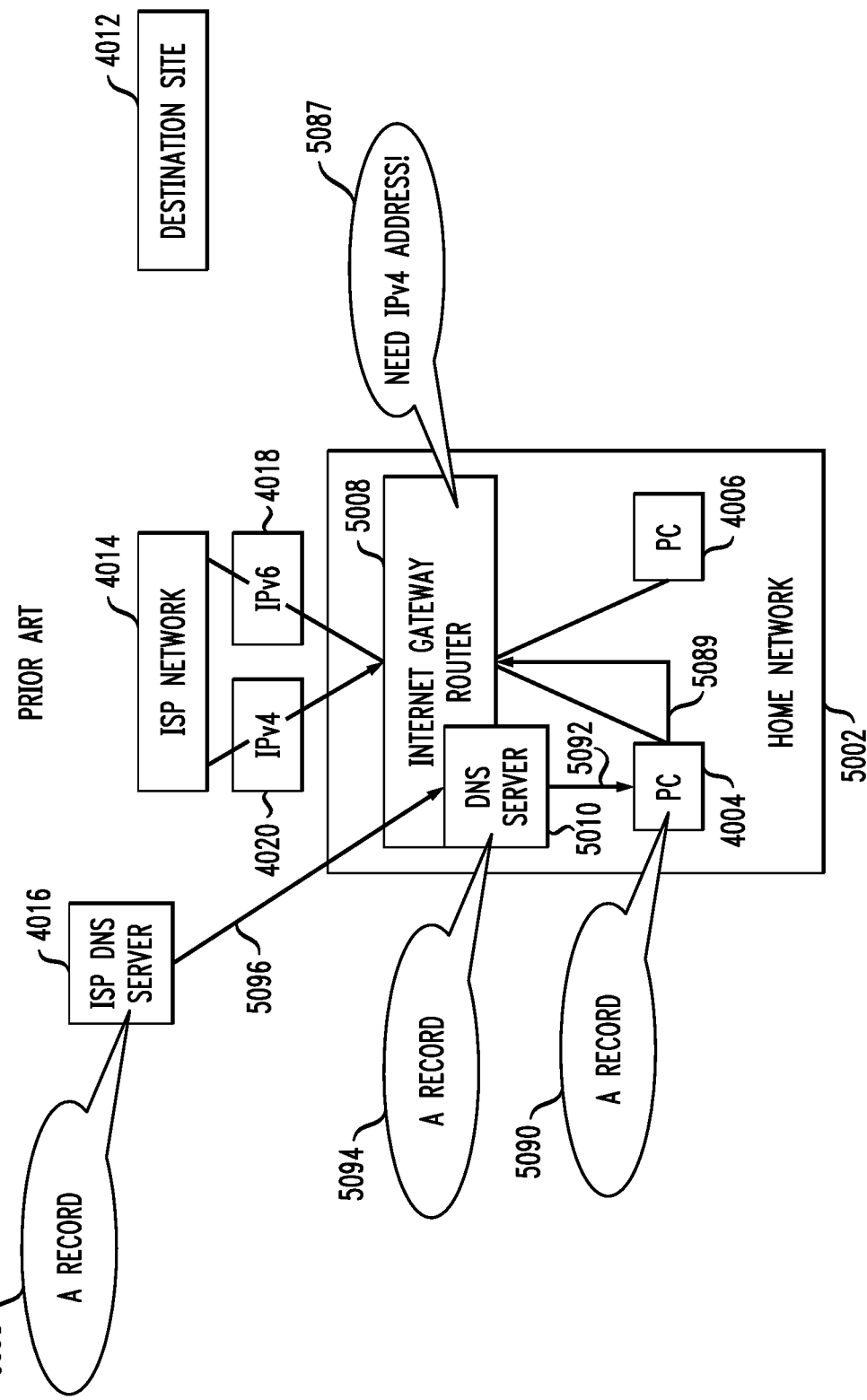
Figure 24:
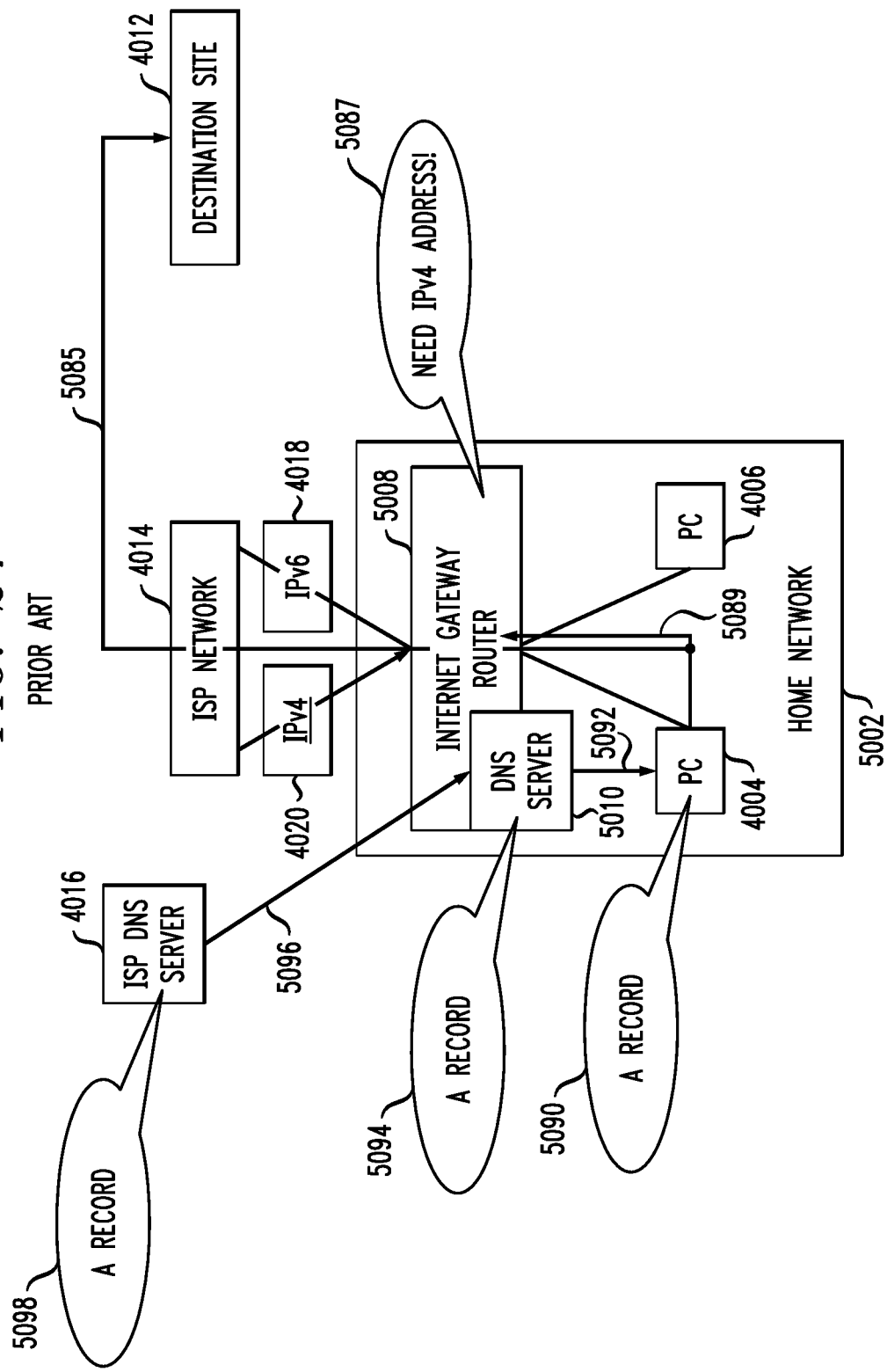

In FIG. 20, the PC 4004 has the A-record, as seen at 5090. In FIG. 21, the PC 4004 sends a connection attempt through the Internet gateway router 5008, as seen at 5089. In FIG. 22, the Internet gateway router 5008 realizes that it does not have an active IPv4 connection, as shown at 5087. In FIG. 23, the IPv4 connection has been built so that the IPv4 connection 4020 is shown as a solid line to indicate that it is active. Finally, in FIG. 24, the PC 4004 sends the connection to the destination site 4012 via IPv4, as seen at 5085. However, the process depicted in FIGS. 16-24 typically takes longer than the average timeout, such that the attempt to connect typically ends in failure.

Figure 25:
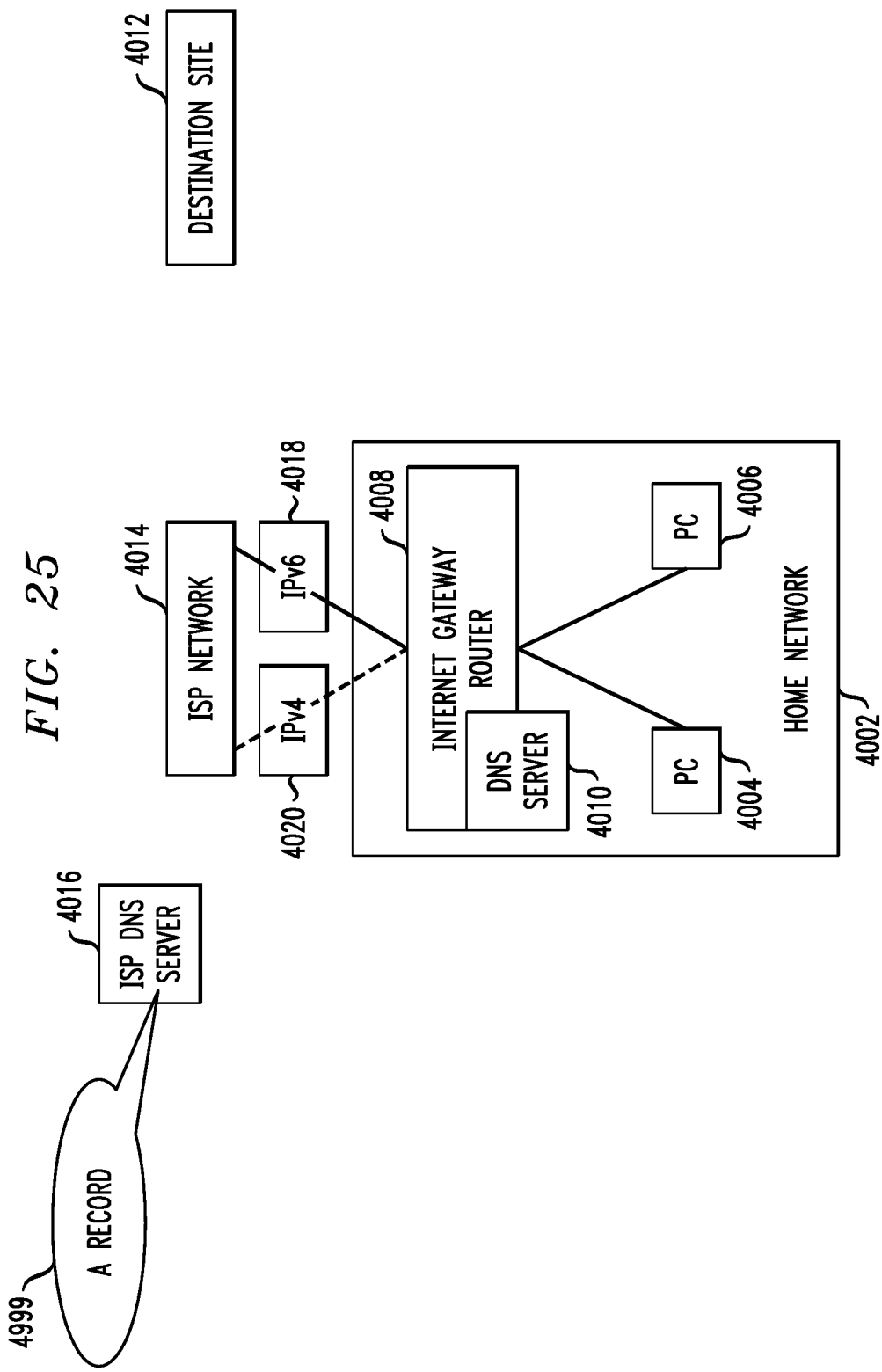
FIGS. 25-31 depict a system, in accordance with an aspect of the invention, accessing an IPv4 destination site.
Figure 26:
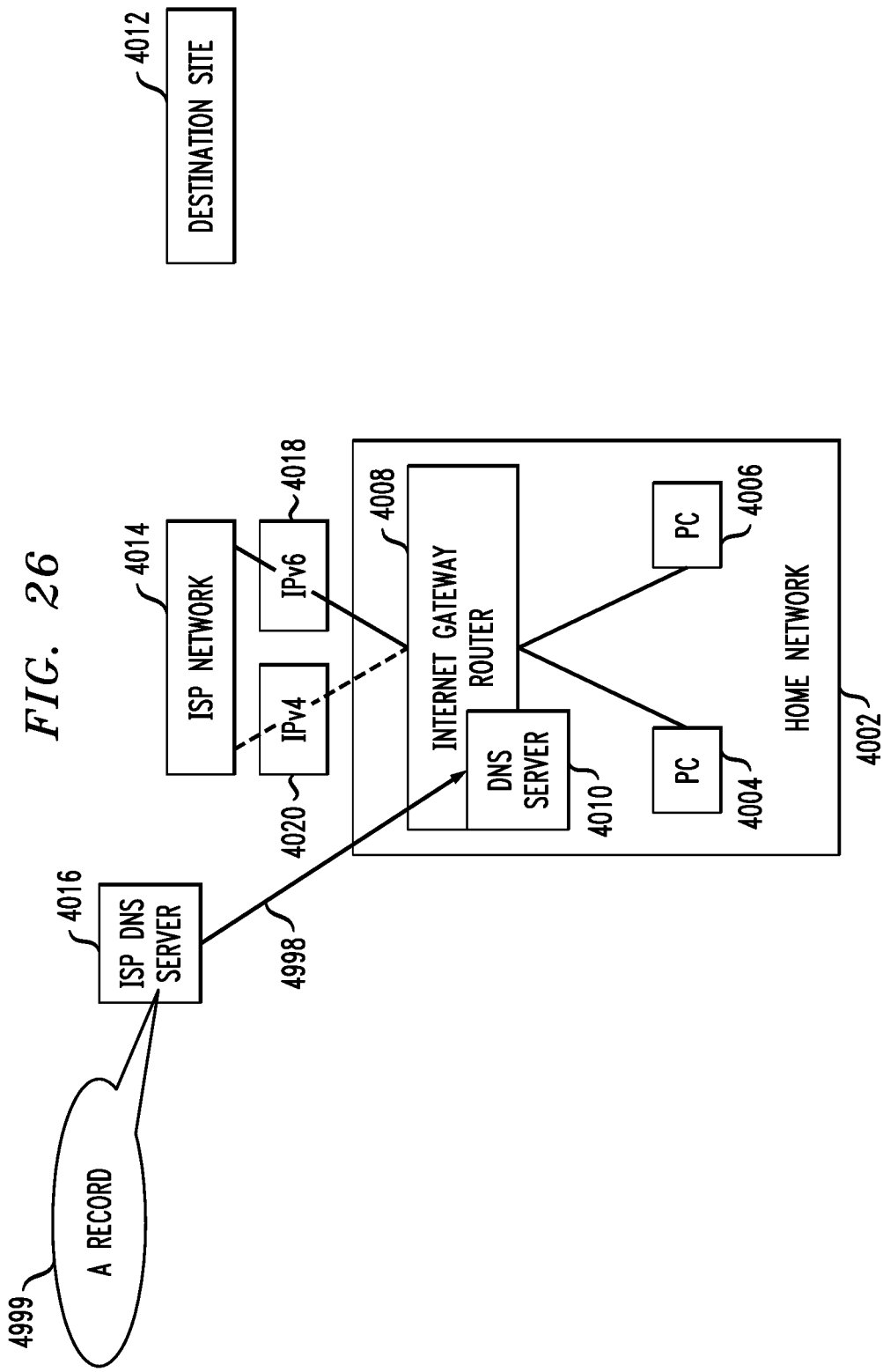
Figure 27:
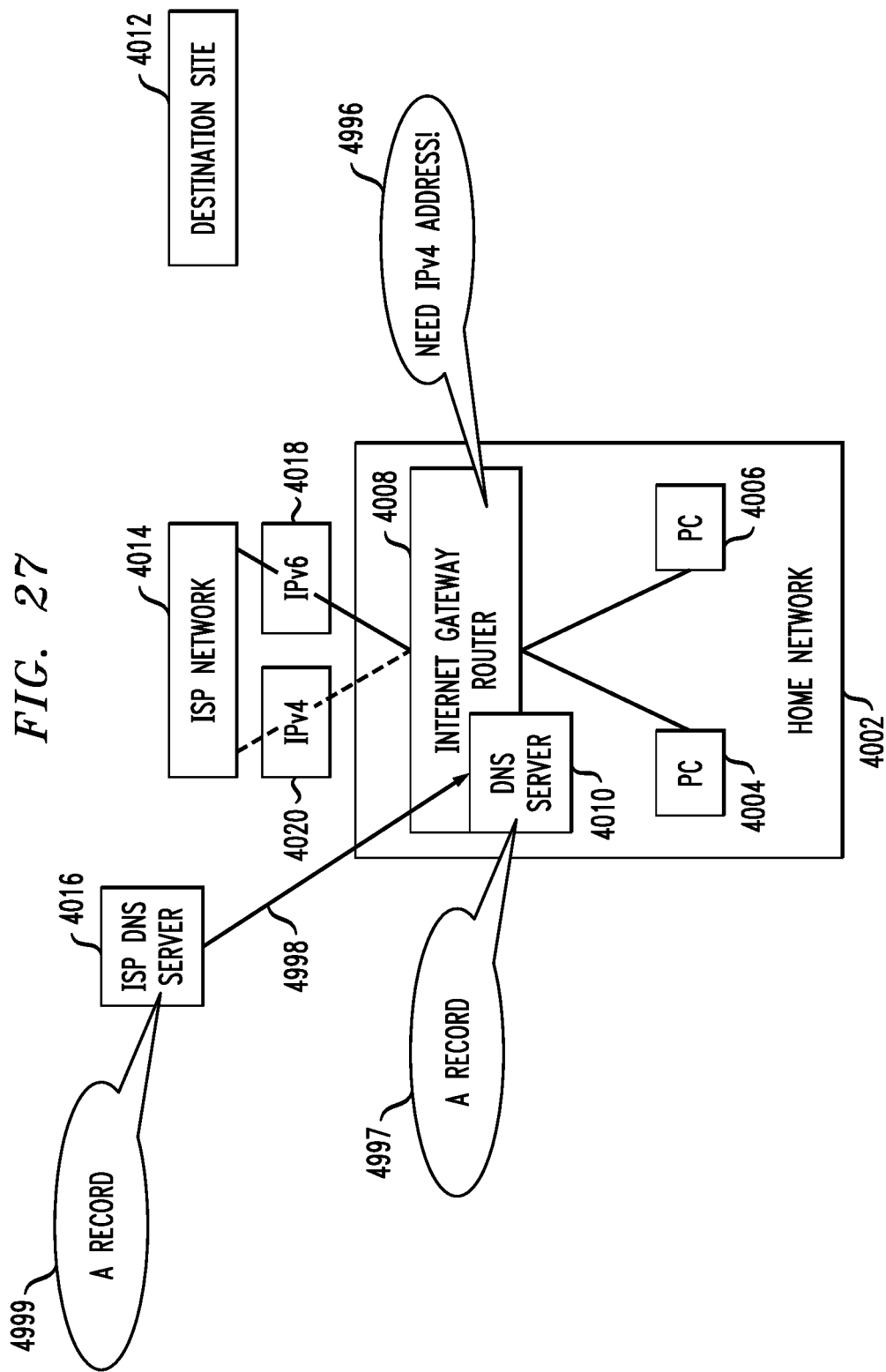

FIGS. 25-31 show a successful IPv4 connection in accordance with an aspect of the invention, using the same system described with respect to FIGS. 4-15. In FIG. 25, the ISP's DNS server 4016 has an A-record, as seen at 4999. In FIG. 26, the ISP's DNS server 4016 sends the A-record to the local DNS server 4010, as indicated by arrow 4998. In FIG. 27, the local DNS server 4010 sees the A-record, as shown at 4997, and realizes that it needs an IPv4 address, as seen at 4996.

Figure 28:
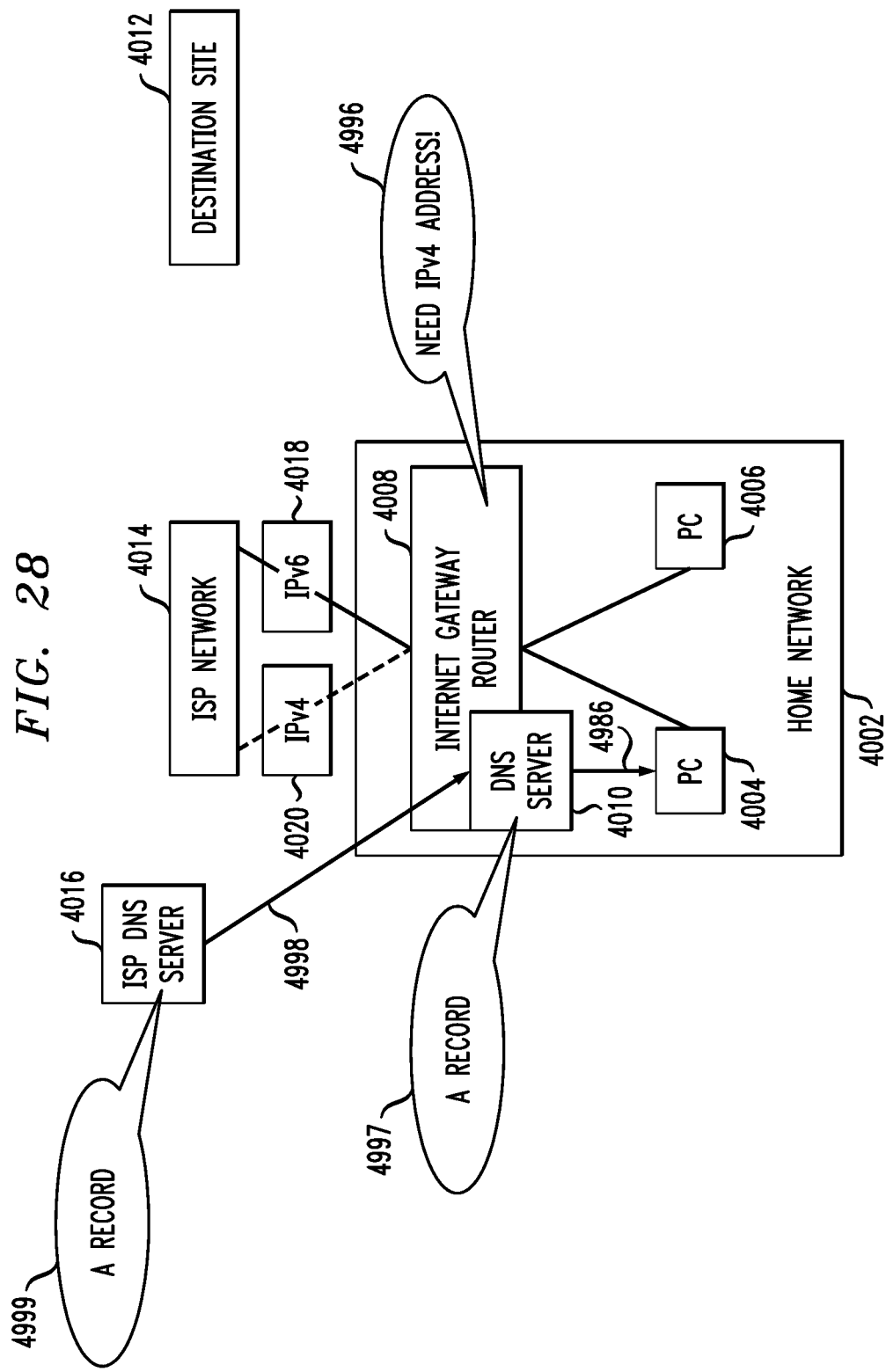
Figure 29:
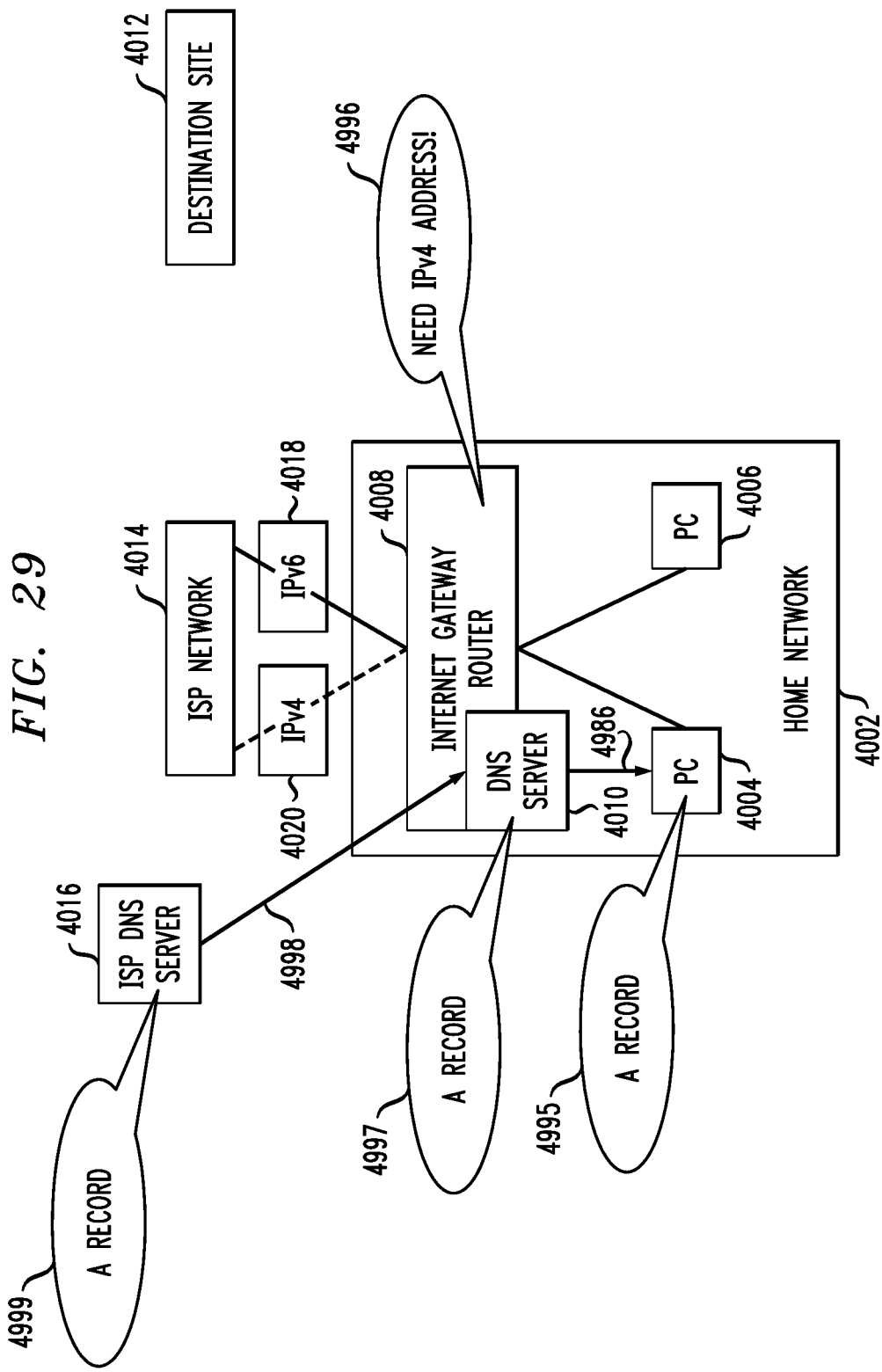
Figure 30:
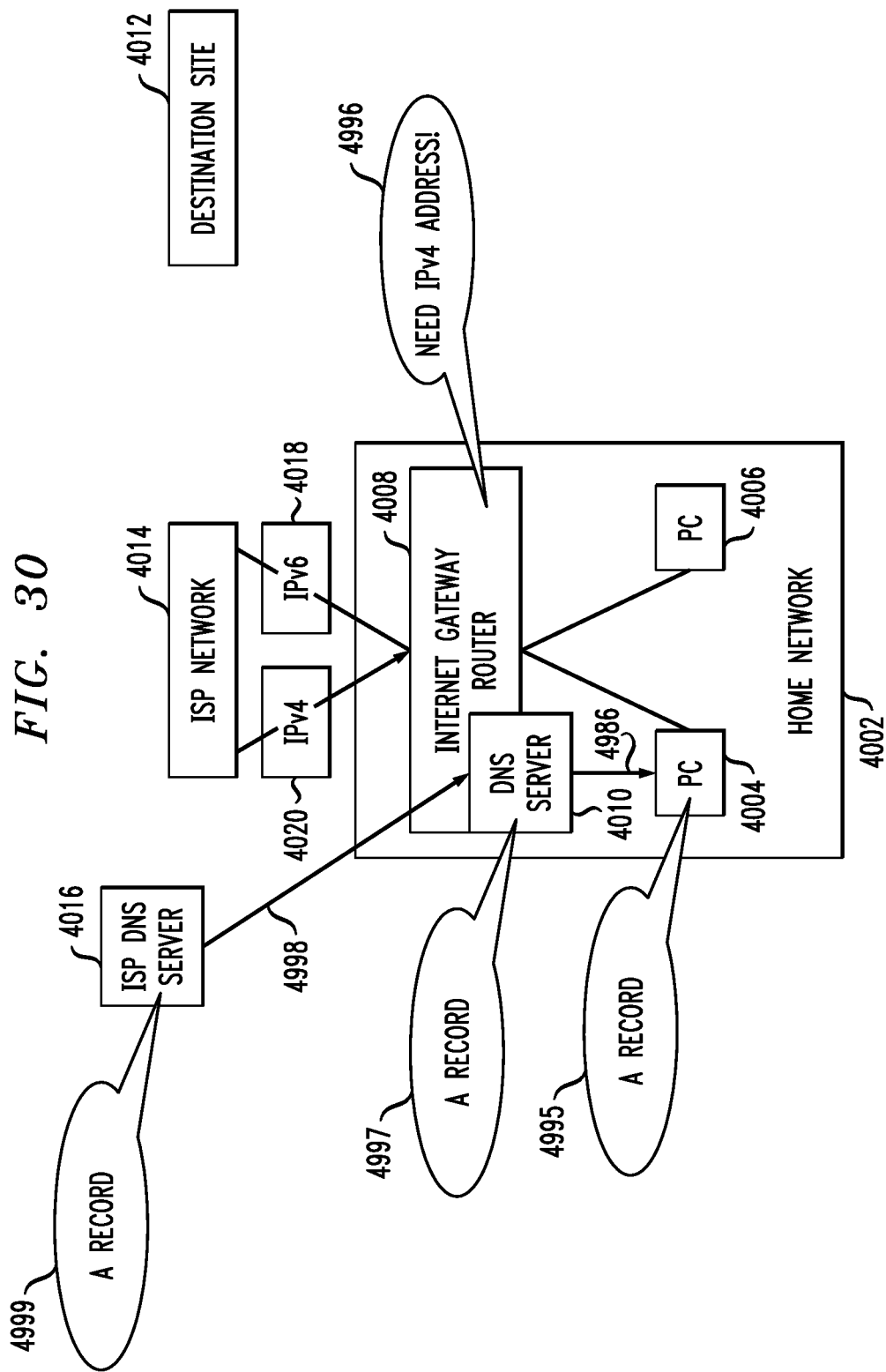
Figure 31:
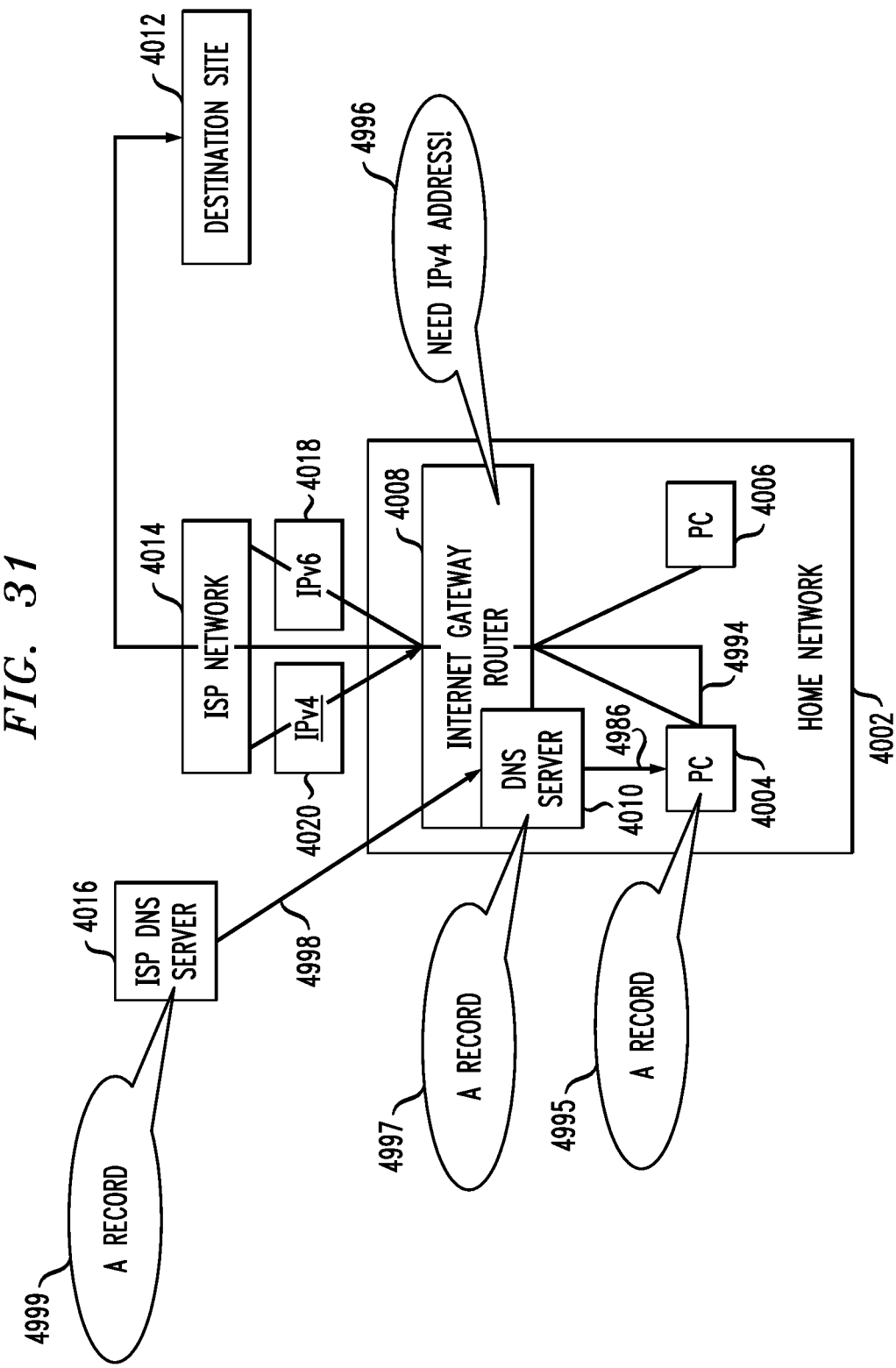

In FIG. 28, the local DNS server 4010 responds back to the PC 4004 with the A-record, as indicated by arrow 4986; the A-record is then at the PC 4004 as shown at 4995 in FIG. 29. While this is happening, the ISP network 4014 is setting up the IPv4 connection so that there is an active IPv4 connection 4020, as shown in FIG. 30 (solid line) by the time the PC 4004 seeks to connect to the destination site 4012 via IPv4, as seen at 4994 in FIG. 31. The parallelism, based on treating receipt of the A-record as a clue that an IPv4 connection will soon be needed, typically gives an extra few hundred milliseconds needed to allow the desired connection to occur without a timeout, or at least to significantly reduce the likelihood of an impact to the consumer, in the form of a failure due to timeout, when he or she tries to make an IPv4 connection.

One or more embodiments thus advantageously use DNS as a clue and/or trigger to start the process of provisioning an IPv4 connection on the WAN side of the router, eliminating or at least reducing delay issues as described with respect to FIGS. 16-24.

One or more embodiments can be implemented, for example, by providing suitable functionality within the Internet Gateway Router 5008, with built-in DNS server 5010. Functionality is provided therein to monitor what data is going past and to make a behavioral decision based on what type of data is going past.

It should be noted that one or more embodiments of the invention can be implemented in a variety of hardware platforms, and the block diagrams herein are a non-limiting example. In some cases, unit 4008 is an advanced wireless gateway in the form of an approved DOCSIS 3.0 cable modem with gateway router functions. Such equipment could, for example, be supplied to customers of an MSO. However, unit 4008 could also be, for example, a generally available standalone wireless router (e.g. customer purchases from a retailer, plugs into broadband modem).

Many instances address a situation where the internet gateway router or similar device acts as both an "edge" facing the MSO or the like and a "core" serving all clients within the customer premises network.

One or more embodiments permit avoiding the use of a CGN by having an alternate method of address sharing. However, one or more embodiments can also be used in conjunction with a CGN as a way to reduce the usage of IPv4 and consolidate the number of customers associated with a single CGN as well.

One or more embodiments of the invention enable avoidance of use of CGN as an IPv4 address-sharing mechanism. CGN is not completely transparent in function, and may cause adverse impacts (degraded, impaired or otherwise failed service) for some applications and communications. These cause undesirable customer impact. In addition, one or more embodiments enable use of IPv4 address oversubscription (sharing addresses between multiple customers) based on the assumption of non-simultaneous use (instead of today's always-on connectivity); i.e., IPv4 addresses are not in continuous use by all customers, and therefore can be moved around (assigned temporarily and reclaimed when idle) between customers as IPv4 connectivity is needed.

Yet further, one or more embodiments enable use of the above oversubscription/on-demand IPv4 addressing without the risk of IPv4 data connection failures when a host attempts to make an IPv4 connection but an IPv4 address is not available to send the data in the time before the failure timer elapses—this causes customer impact in the form of web pages failing to load or loading only after a significant delay, applications failing to connect to servers, and the like, often requiring the user to manually retry their connection.

Even further, one or more embodiments enable more widespread use of IPv6 for communications by ensuring that even devices that only make DNS queries over IPv4 (e.g. personal computers (PCs) running the Windows XP operating system (OS)) are not causing IPv4 to remain in use for DNS (that is to say, in order for the CPE router's DNS server to implement appropriate functionality as described herein, it should watch for all DNS queries, whether over IPv4 transport or IPv6 transport. There are some host stacks (Windows XP being the primary example) that have a full IPv6 implementation, but they do not carry out DNS queries over IPv6. That is, if they query, they will use IPv4 *transport* to talk to the DNS server, but if they receive an AAAA (IPv6) DNS record back in response, they will initiate the connection to the remote site via IPv6 as expected. One or more embodiments listen locally for IPv4 DNS queries, but make the queries to the external DNS server (e.g. recursive DNS server) via IPv6, meaning that the gateway router intercepts any of those IPv4-only DNS queries and prevents them from triggering an IPv4 address to be allocated. This last aspect, in essence, involves acting as a shim layer to ensure that DNS queries can be sent via IPv4 or IPv6 transport locally within the customer LAN, but that the queries are sent externally only over IPv6 transport. Furthermore, this last aspect can, if desired, be implemented independently of the triggering techniques disclosed herein (although in a preferred approach, the techniques are implemented together).

Thus, in some current cases, such as where one of the hosts is a Windows XP machine, server 4010 may make DNS queries over IPv4 even though the ultimate connection may be IPv6. In some embodiments, rather than simply forwarding the IPv4 request, server 4010 translates the request to IPv6 before forwarding to server 4016, to avoid unnecessary establishment of an IPv4 connection. Further, server 4010 can translate an IPv6 response form server 4016 back to IPv4 for the Windows XP host. It will be appreciated that this aspect relates to an application layer gateway.

Recapitulation

Figure 32:
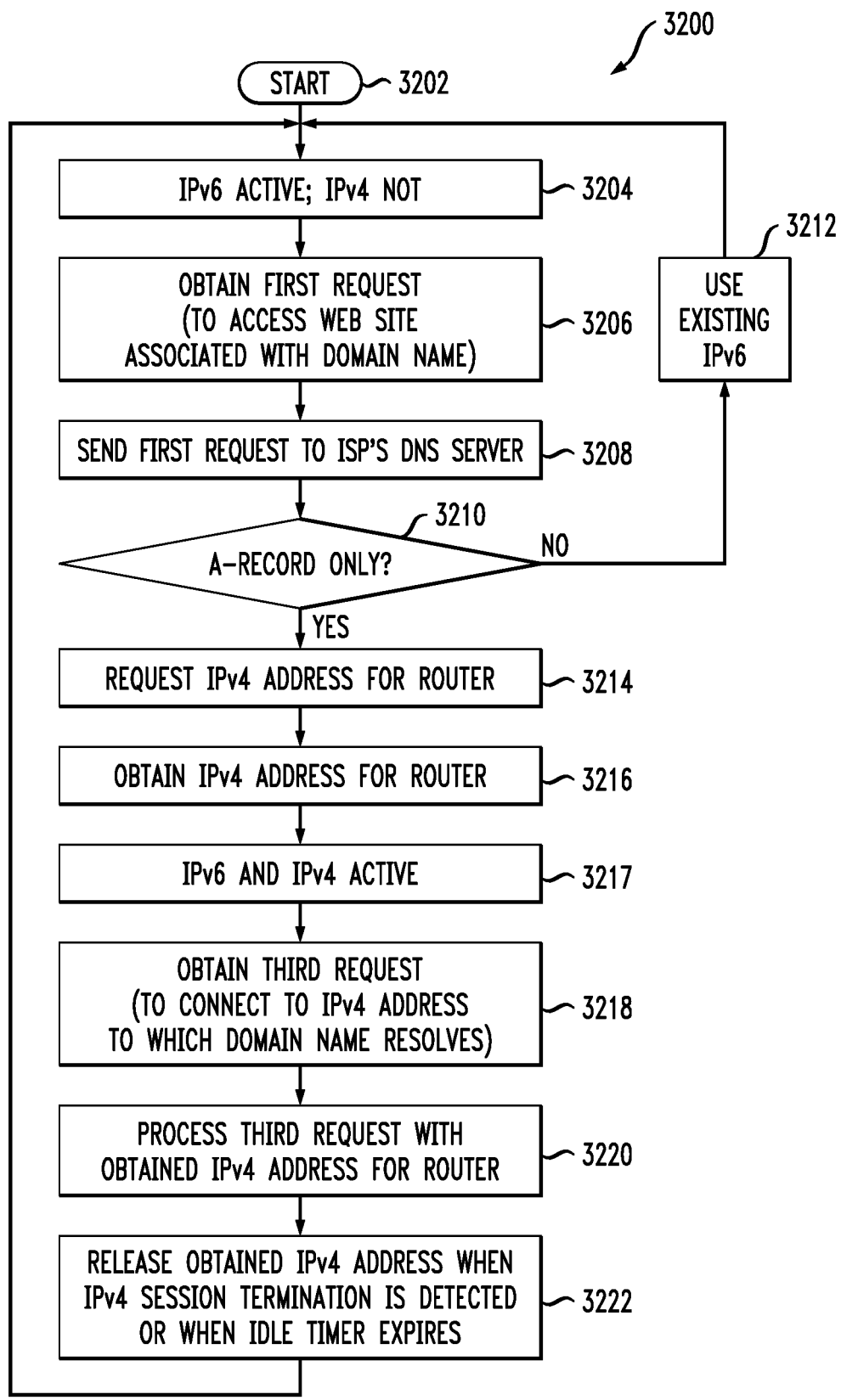
FIG. 32 shows an exemplary flow chart, according to an aspect of the invention.

Reference should now be had to flow chart 3200 of FIG. 32, which begins at 3202. Given the discussion thus far, it will be appreciated that, in general terms, an exemplary method, according to an aspect of the invention, includes the step 3206 of obtaining, at a gateway router 4008 interposed between a local area network 4002 and an internet service provider's infrastructure 4014, from a host 4004 on the local area network, a first request. The first request is a request to access a web site 4012 associated with a domain name (see, e.g., 4022, 4024). Notations such as "first request," "second request," "third request" and so on are for convenience only to differentiate the various requests from each other and do not necessarily imply that a given request is the first, second, or third one ever received, and so on.

The gateway router has Domain Name Service (DNS) resolver capability 4010. As seen at 3204, the first request is received while the gateway router has upstream connectivity to the internet service provider's infrastructure via Internet Protocol Version 6 (IPv6) but not via Internet Protocol Version 4 (IPv4).

Further steps include step 3208, sending, from the gateway router, the first request; and obtaining, at the gateway router, an indication that an Internet Protocol Version 4 (IPv4) address will imminently be required for the gateway router. In some instances, this indication is an indication that the domain name resolves to an internet protocol version four (IPv4) address. The indication could be, for example, as discussed further below with respect to steps 3210, 3212. However, in other instances, the indication could be a local host making a request for a UPnP port mapping on IPv4— that is, if the host is requesting that the CPE router open an inbound port so that the application can listen for inbound connection attempts. This could also be used as a trigger to request an address as well, with the idle timer expiring when the UPnP port mapping expires. This aspect is discussed further below.

A further step 3214 includes, responsive to obtaining the indication, sending, from the gateway router, into the internet service provider's infrastructure, a second request. The second request is for an Internet Protocol Version 4 (IPv4) address for the gateway router (to the DHCP server 3304). Furthermore in this regard, receiving the indication (e.g., A-record) that an Internet Protocol Version 4 (IPv4) address will imminently be required can be a triggering event that triggers the second request. The request is triggered before the third request 3218, discussed further below, is obtained.

In some cases, the first request is sent to a domain name server 4016 of said internet service provider's infrastructure. On the other hand, in some cases, the first request is sent to a root server 4012 associated with said domain name; for example, in some cases, server 4010 performs the recursion that would otherwise be done by the ISP's server 4016. In this aspect, server 4010 directly accesses root server 4012 to identify the authoritative server.

In at least some instances, further steps include, as at 3216, obtaining, at the gateway router, the Internet Protocol Version 4 (IPv4) address for the gateway router (from the DHCP server 3304); as at 3218, obtaining, at the gateway router, from the host on the local network, a third request. The third request is a request to connect to the Internet Protocol Version 4 (IPv4) address to which the domain name resolves; and, as at 3220, processing the third request, by the gateway router, using the Internet Protocol Version 4 (IPv4) address for the gateway router obtained in step 3216.

As indicated at 3217, once the IPv4 address is obtained for the router, both IPv6 and IPv4 are active.

In at least some cases, the IPv4 address for the router is released when IPv4 session termination is detected or when idle timer expires, as shown at 3222, and the system state returns to 3204.

In one or more embodiments, the first request is a fully qualified domain name (FQDN).

Refer now to steps 3210 and 3212. In one or more instances, the indication is an A-record. In one or more embodiments, the indication is an indication that the domain name resolves solely to the Internet Protocol Version 4 (IPv4) address; for example, as shown in block 3210 and the "YES" branch thereof, an A-record is obtained without a quad-A record.

In some cases, both an A-record and a quad-A record are obtained. One could still choose IPv4 connectivity in such a case, and could employ one or more techniques of the invention; however, it is believed that in many instances, it will be desirable to simply use the IPv6 connectivity in this case. Thus, for example, some instances include obtaining, at the gateway router, from another host (in general, this other host could be the same one 4004 or a different one 4006) on the local area network 4002, a fourth request. The fourth request is a request to access another web site associated with another domain name. The fourth request could be received while the gateway router has the upstream connectivity to the internet service provider's infrastructure via the Internet Protocol Version 6 (IPv6) but not via the Internet Protocol Version 4 (IPv4), as at 3204. Further step could include sending, from the gateway router, to the domain name server of the internet service provider's infrastructure, the fourth request; and obtaining, at the gateway router, an indication that the other domain name resolves to both an Internet Protocol Version 4 (IPv4) address and an Internet Protocol Version 6 (IPv6) address. Thus, steps 3206, 3208, and 3210 could be repeated based on the fourth request. In this case, decision block 3210 yields a "NO" since the other domain name resolves to both the Internet Protocol Version 4 (IPv4) address and the Internet Protocol Version 6 (IPv6) address; the other web site is accessed via Internet Protocol Version 6 (IPv6).

In some cases, in said step 3206 of obtaining said first request, said first request is made in (i.e., received from the host in) Internet Protocol Version 6 (IPv6). However, in some cases, said first request is made in (i.e., received from the host in) Internet Protocol Version 4 (IPv4), in which case a further step can include translating said first request into Internet Protocol Version 6 (IPv6) at said gateway router.

Then, in said step 3208 of sending said first request, said first request is sent in Internet Protocol Version 6 (IPv6). The response can be received in IPv6 and translated back to IPv4 before sending down to the local host.

Furthermore in this regard, a useful distinction can be made between IPv4 and IPv6 on the transport side of DNS versus IPv4 and IPv6 on the content side of DNS.

In a further aspect, also discussed below in the exemplary system and article of manufacture details, a further step includes providing a system, wherein said system comprises distinct software modules. Each of the distinct software modules is embodied on at least one tangible computer readable recordable storage medium. Referring again to FIG. 3, in some cases, said distinct software modules include a DNS client/server module 393 and a DHCP client/server module 392. In such cases, said obtaining of said first request 3206, said sending of said first request 3208, and said obtaining of said indication 3210 are all carried out by said DNS client/server module executing on at least a one hardware processor of said gateway router. The "trigger" occurs when the DNS client/server module notifies the DHCP client/server module. Said sending of said second request is carried out by said DHCP client/server module executing on said at least a one hardware processor of said gateway router.

In another aspect, an exemplary gateway router 4008 is provided for interposition between a local area network 4002 and an internet service provider's infrastructure 4014. Referring to FIG. 3 for a non-limiting example, the gateway apparatus includes a memory and at least one processor 306, coupled to the memory, and operative to carry out or otherwise facilitate any one, some, or all of the method steps described herein. In this aspect, "memory" should be broadly construed to encompass memory 310 and storage 308.

In one or more embodiments, the memory stores, in a non-transitory manner, a plurality of distinct software modules; for example, a DNS client/server module 393 and a DHCP client/server module 392. Said DNS client/server module includes instructions configured to cause said at least one processor to obtain, from a host on said local area network, a first request. Said first request is to access a web site associated with a domain name. Said gateway router has Domain Name Service (DNS) resolver capability. When the router is actually in operation, said first request will typically be received while said gateway router has upstream connectivity to said internet service provider's infrastructure via Internet Protocol Version 6 (IPv6) but not via Internet Protocol Version 4 (IPv4). Said DNS client/server module further includes instructions configured to cause said at least one processor to send, to a domain name server of said internet service provider's infrastructure, said first request; and obtain an indication that an Internet Protocol Version 4 (IPv4) address will imminently be required for said gateway router. Said DHCP client/server module includes instructions configured to cause said at least one processor to, responsive to obtaining said indication, send, into said internet service provider's infrastructure, a second request. Said second request is for an Internet Protocol Version 4 (IPv4) address for said gateway router.

In one or more embodiments, gateway apparatus 106 includes DNS client/server code 393, NAT code 394, and/or DHCP client/server code 392, stored in persistent storage 308 and loadable into memory 310 to configure processor 306 to implement any one, some, or all of the steps and/or other functionality described herein. In one or more embodiments, modifications to enable functionality in accordance with one or more embodiments of the invention are implemented as a shim of existing DNS client/server code and DHCP client/server code.

In some cases, the router is built as a custom software load for a given MSO, DSL provider, or fiber to the home, curb, or node provider. The manufacturer provides such an entity with the router, including code, and with certain features and/or settings turned on (or off). The router itself per se may be something that can be purchased out of the box but the configurations, in this aspect, are specific to the MSO, DSL provider, or fiber to the home, curb, or node provider. In other cases, the customer provides his or her own device. In both cases functionality will not necessarily be based on provisioning; rather, there is a feature built into the router. Similar to the other module functions, there are configuration items that can be turned off and on so as to change the way they behave. For example, change the wireless SSID, turn wireless on and off, and so on. The router may ship with a feature possible in the code or not; independent of whether it is configured to be enabled or disabled. That is, the router may be shipped with these features in software but the user or a technician may need to select from a menu to enable or disable desired features as the case may be. In the claims, software is "configured" to carry something out regardless of whether a required selection of a feature is made by a technician or end user.

Figure 34:
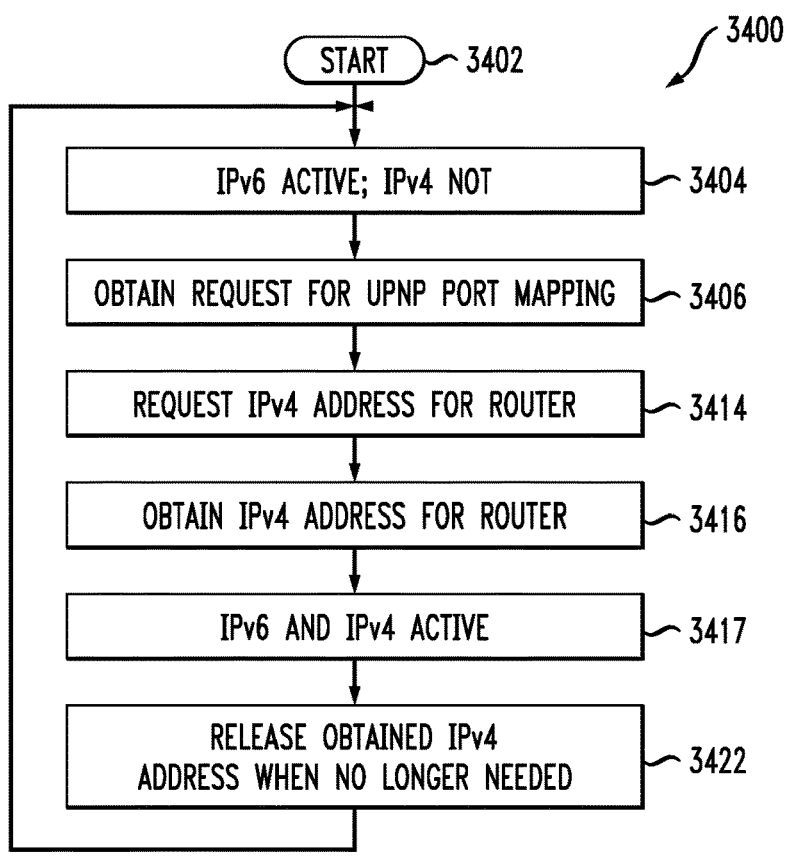
FIG. 34 shows another exemplary flow chart, according to another aspect of the invention.

Refer now to flow chart 3400 of FIG. 34, which begins at 3402. As noted above, in some instances, the triggering event for requesting an IPv4 address could be a local host making a request for a UPnP port mapping on IPv4—that is, if the host is requesting that the CPE router open an inbound port so that the application can listen for inbound connection attempts. Another exemplary method, according to another aspect of the invention, includes the step 3406 of obtaining, at a network address translation module 394 of a gateway router, a request from a local host for a universal plug and play port mapping on Internet Protocol Version 4 (IPv4). This is typically of interest, for example, while IPv6 is active but IPv4 is not, as shown at 3404. A further step 3414 includes, responsive to obtaining said request, sending, from said gateway router, into an infrastructure of an internet service provider, a request for an Internet Protocol Version 4 (IPv4) address for said gateway router. Once this address is obtained at 3416, both IPv4 and IPv6 will be active, as at 3417, until the IPv4 address is released when no longer needed, at 3422, and the state returns to 3404. As noted, in some instances, the idle timer expires when the UPnP port mapping expires.

As noted above, in some cases an additional method step includes providing a system, in turn comprising a plurality of distinct software modules. In this UPnP port mapping aspect, said distinct software modules could include a network address translation module 394 and a DHCP client/server module 392. Step 3406 could be carried out by said network address translation module executing on at least one hardware processor of said gateway router. Step 3414 could be carried out by said DHCP client/server module executing on said at least a one hardware processor of said gateway router.

In this particular instance, NAT module 394 on router 106 preferably supports UPnP Internet Gateway Device (IGD) to enable NAT traversal (techniques that establish and maintain Internet protocol connections traversing network address translation (NAT) gateways).

By way of example, many things in a networking application may require listening on an incoming port. For example, consider the Skype VoIP application. The only way to receive incoming calls is for there to be an established relationship so that a request can forwarded from Skype through the NAT down to the individual host. The IP address of a host on a private network typically means nothing to the outside world. When the PC signs into Skype there must be a mechanism for Skype to find it and an open port for listening. Web servers accepting inbound connections typically listen on port 80, which is the well-known port for HTTP. Skype typically does not use the well-known port. UPnP allows the end hosts the ability to communicate with the upstream router and request a port on the outbound side to allow them to listen for incoming requests. The hosts instruct router 4008 that if it receives an incoming request on the port that it has opened up, the same should be forwarded to the host. The NAT and firewall built into gateway router 4008 will be expecting the inbound connections and will not drop them. Conventionally, a NAT looks for internally-initiated connections; this aspect of the invention allows inbound connections without the outbound connection initiated. The end result is, in effect, a stand-by scenario. NAT module 394 on the gateway router obtains a UPnP port mapping request from one of the downstream hosts; that request is the trigger that lets the router know that it needs to request an IPv4 address. In current systems, the first indication is the NAT module getting IPv4 traffic destined for the outside world; inbound traffic has no way to trigger a connection and it may fail. However, using this embodiment, if inbound traffic is expected, UPnP mapping precedes it and therefore can be used as a trigger to determine that an IPv4 address is necessary.

A gateway router 4008 can also be provided to implement the UPnP aspect. The memory may store, in a non-transitory manner, a plurality of distinct software modules; for example, a network address translation module 394 and a DHCP client/server module 392.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

Many aspects of the invention can be implemented, for example, on a gateway router such as an advanced wireless gateway or similar device, as shown in FIG. 3, with suitable software layers to implement logic as described herein. Some aspects of the invention may involve a server or other general purpose computer.

Furthermore, in some instances, aspects of the invention could be implemented into a general-purpose computer provided that the computer implements one or more of the functions performed by a CPE router as described elsewhere herein; namely, providing one or more of the following functions—local DNS server, DHCP server for local hosts and client to broadband network, and/or NAT for IPv4. Stated in an alternative manner, if the CPE router (which has a DNS, DHCP, firewall, NAT, and the like) all in one box with several separate boxes that include those components, e.g. a "dumb" Ethernet switch, a wireless access point (AP), a standalone broadband modem, and a PC or other general purpose computer configured to provide DNS/DHCP and/or firewall and configure the network such that it works as described herein. The term "gateway router" as used in the claims is intended to be construed to encompass such implementations as well. In contrast, the term "dedicated gateway router" is defined as limited to an implementation effectuated with a purpose-built router, which could include:
   traditional specialized router hardware; and/or
   a software implementation on a general purpose processor (e.g., a Linux box) with extra Ethernet ports and wireless chipsets.

Figure 33:
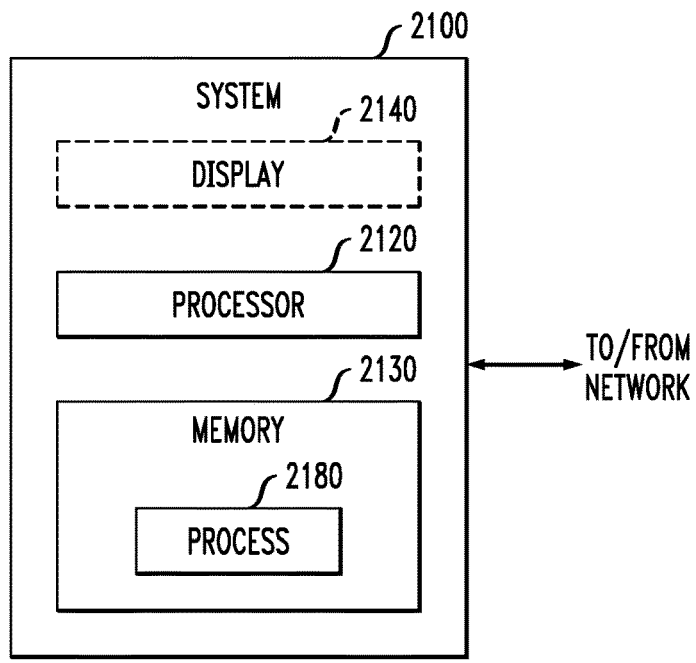
FIG. 33 is a block diagram of an exemplary computer system useful in implementing at least a portion of one or more embodiments of the invention.

FIG. 33 is a block diagram of a system 2100 that can implement some pertinent aspects or processes, processor 2120 of which is representative of processors associated with servers, clients, set top terminals or gateways 106, DBWAD, SRM, GSRM, MAS 104A, personal media devices, DNS server 3303, DHCP server 3304, smart phones, desktop/laptop or other personal computers, smart roaming devices, and any other elements with processing capability depicted in the other figures. In one or more embodiments, inventive steps are carried out by one or more of the processors in conjunction with one or more interconnecting network(s). Again, in some cases, most or all steps are carried out, or at least facilitated by, the advanced wireless gateway of FIG. 3 or another gateway router device.

As shown in FIG. 33, memory 2130 configures the processor 2120 to implement one or more aspects of the methods, steps, and functions disclosed herein (collectively, shown as process 2180 in FIG. 33). The memory 2130 could be distributed or local and the processor 2120 could be distributed or singular. The memory 2130 could be implemented as an electrical, magnetic or optical memory, or any combination of these or other types of storage devices. It should be noted that if distributed processors are employed, each distributed processor that makes up processor 2120 generally contains its own addressable memory space. It should also be noted that some or all of computer system 2100 can be incorporated into an application-specific or general-use integrated circuit. For example, one or more method steps could be implemented in hardware in an ASIC rather than using firmware. Display 2140 is representative of a variety of possible input/output devices (e.g., mice, keyboards, printers, etc.).

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system including hardware, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. As used herein, a tangible computer-readable recordable storage medium is intended to encompass a recordable medium which stores instructions and/or data in a non-transitory manner, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, in some instances, the term "memory" encompasses any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

As used herein, including the claims, a "server" includes a physical data processing system (for example, system 2100 as shown in FIG. 33) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include, for example, a DNS client/server module 4010 and a DHCP client/server module; any or all of the software components shown in the figures can be implemented with suitable modules. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules. In one or more embodiments, the code is stored in a non-transitory manner.

Furthermore, with regard to DNS client/server module 4010 has been referred to herein loosely as a DNS server but it will be appreciated that in one or more embodiments it acts as a DNS server to downstream clients 4004, 4006 and as a DNS client to upstream server 4016. Similarly, router 4008 preferably also executes a DHCP client/server module where in acts as a DHCP server to downstream clients 4004, 4006 and as a DHCP client to an upstream DHCP server such as 3304. See elements 392, 393, and 394 in FIG. 3.

Non-limiting examples of languages that may be used include markup languages (e.g., hypertext markup language (HTML), extensible markup language (XML), standard generalized markup language (SGML), and the like), C/C++, assembly language, Pascal, Java, EBIF—Extended Binary Interchange Format language, UNIX shell scripts (for example, to generate information to supply to the GSRM), and the like. Note that EBIF would typically only be employed in connection with a set-top box. RTSP and/or RPC can be employed for interface protocols, for example.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

System(s) have been described herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). Thus, any blocks, components, sub-blocks, sub-components, modules and/or sub-modules may be realized by one or more DSPs. A DSP typically comprises a combination of digital logic devices and other components, which may be a state machine or implemented with a dedicated microprocessor or micro-controller running a software program or having functions programmed in firmware.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   obtaining, at a network address translation module of a gateway router, a request from a local host for a universal plug and play port mapping on Internet Protocol Version 4 (IPv4);
   responsive to obtaining said request, sending, from said gateway router, into an infrastructure of an internet service provider, a request for an Internet Protocol Version 4 (IPv4) address for said gateway router; and
   establishing an IPv4 connection between said gateway router and said infrastructure of said internet service provider using said address for said gateway router.

2. The method of claim 1, further comprising providing a system, wherein said system comprises distinct software modules, each of said distinct software modules being embodied on at least one tangible computer readable recordable storage medium, and wherein said distinct software modules comprise a network address translation module and a DHCP client/server module;
   wherein:
   said obtaining of said request is carried out by said network address translation module executing on at least one hardware processor of said gateway router; and
   said sending of said request is carried out by said DHCP client/server module executing on said at least a one hardware processor of said gateway router.

3. A gateway router comprising:
   a memory storing in a non-transitory manner a plurality of distinct software modules, said distinct software modules comprising a network address translation module and a DHCP client/server module; and
   at least one processor, coupled to said memory;
   wherein:
   said network address translation module comprises instructions configured to cause said at least one processor to obtain a request from a local host for a universal plug and play port mapping on Internet Protocol Version 4 (IPv4); and
   said DHCP client/server module comprises instructions configured to cause said at least one processor to, responsive to obtaining said request, send, into an infrastructure of an internet service provider, a request for an Internet Protocol Version 4 (IPv4) address for said gateway router, and
   wherein said network address translation module further comprises instructions configured to cause said at least one processor to establish an IPv4 connection to said infrastructure of said internet service provider using said address for said gateway router.

4. A non-transitory computer readable medium comprising computer executable instructions which when executed by a computer cause the computer to perform the method of:
   obtaining, at a network address translation module of a gateway router, a request from a local host for a universal plug and play port mapping on Internet Protocol Version 4 (IPv4);
   responsive to obtaining said request, sending, from said gateway router, into an infrastructure of an internet service provider, a request for an Internet Protocol Version 4 (IPv4) address for said gateway router; and
   establishing an IPv4 connection between said gateway router and said infrastructure of said internet service provider using said address for said gateway router.

5. The non-transitory computer readable medium of claim 4, wherein said computer executable instructions comprise distinct software modules, each of said distinct software modules being embodied on said non-transitory computer readable medium, and wherein said distinct software modules comprise a network address translation module and a DHCP client/server module;
   wherein:
   said obtaining of said request is carried out by said network address translation module executing on at least one hardware processor of said gateway router; and
   said sending of said request is carried out by said DHCP client/server module executing on said at least a one hardware processor of said gateway router.

* * * * *